United States Patent
Nilson

(10) Patent No.: US 10,363,579 B2
(45) Date of Patent: Jul. 30, 2019

(54) APPARATUS FOR SEPARATING USABLE CROP FROM INTERMIXED DEBRIS

(71) Applicant: Crary Industries, Inc., West Fargo, ND (US)

(72) Inventor: Michael A. Nilson, West Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 95 days.

(21) Appl. No.: 15/674,827

(22) Filed: Aug. 11, 2017

(65) Prior Publication Data

US 2018/0029081 A1  Feb. 1, 2018

Related U.S. Application Data

(63) Continuation-in-part of application No. 14/630,723, filed on Feb. 25, 2015, now Pat. No. 9,730,380.

(60) Provisional application No. 62/043,817, filed on Aug. 29, 2014.

(51) Int. Cl.

| | |
|---|---|
| B07B 9/02 | (2006.01) |
| B07B 4/08 | (2006.01) |
| B07B 1/15 | (2006.01) |
| A01D 33/08 | (2006.01) |

(52) U.S. Cl.
CPC ............ B07B 9/02 (2013.01); A01D 33/08 (2013.01); B07B 1/155 (2013.01); B07B 4/08 (2013.01)

(58) Field of Classification Search
CPC .. B07B 9/02; B07B 4/08; B07B 1/155; B07B 11/06; B07B 4/00; A01D 33/08
See application file for complete search history.

(56) References Cited

U.S. PATENT DOCUMENTS

| | | | | |
|---|---|---|---|---|
| 3,962,072 A | * | 6/1976 | Ramacher | A01D 51/002 209/140 |
| 4,364,222 A | * | 12/1982 | Ramacher | A01D 51/002 209/139.1 |
| 4,753,296 A | * | 6/1988 | Kruithoff | A01D 17/10 171/17 |
| 5,042,240 A | * | 8/1991 | Rocca | A01D 46/00 198/516 |
| 8,113,353 B2 | * | 2/2012 | Redekop | A01D 90/02 209/137 |

(Continued)

*Primary Examiner* — Arpad Fabian-Kovacs

(74) *Attorney, Agent, or Firm* — Wood, Phillips, Katz, Clark & Mortimer

(57) ABSTRACT

An apparatus for separating usable crop from intermixed debris, the apparatus having: a movable support; a conveying system on the movable support to convey usable crop in a processing path from an upstream input location to a downstream output location; at least a first separating system on the movable support to cause separation of debris intermixed with usable crop in a first manner as usable crop is conveyed; a vacuum system on the movable support downstream of the first separating system to generate a low pressure volume which causes additional debris intermixed with the usable crop to be drawn away from the usable crop; and a collection container on the movable support configured to accumulate debris drawn away from the conveying usable crop. The movable support, conveying system, at least first separating system, vacuum system, and collection container define a unit that can be moved to relocate the apparatus.

23 Claims, 22 Drawing Sheets

(56) References Cited

U.S. PATENT DOCUMENTS

| | | | | |
|---|---|---|---|---|
| 8,591,301 B2* | 11/2013 | Redekop | ............... | A01D 45/028 |
| | | | | 460/100 |
| 2009/0124309 A1* | 5/2009 | Redekop | ................ | A01D 45/02 |
| | | | | 460/100 |
| 2010/0132326 A1* | 6/2010 | Berthet | ................ | A01D 46/285 |
| | | | | 56/328.1 |
| 2010/0291980 A1* | 11/2010 | Ricketts | ................ | A01D 45/02 |
| | | | | 460/26 |
| 2012/0248012 A1* | 10/2012 | Ungerechts | ............. | B07B 4/025 |
| | | | | 209/137 |
| 2014/0069471 A1* | 3/2014 | Cross | .................... | A01D 33/04 |
| | | | | 134/147 |
| 2014/0144118 A1* | 5/2014 | Le Neve | .............. | A01D 46/285 |
| | | | | 56/328.1 |
| 2014/0221060 A1* | 8/2014 | Le Neve | .............. | A01D 46/285 |
| | | | | 460/143 |
| 2015/0201553 A1* | 7/2015 | Kalverkamp | .......... | A01D 33/04 |
| | | | | 209/472 |
| 2016/0368025 A1* | 12/2016 | Cappozzo | ................ | B07B 1/15 |
| 2017/0367263 A1* | 12/2017 | Robert | ................ | A01D 51/002 |

* cited by examiner

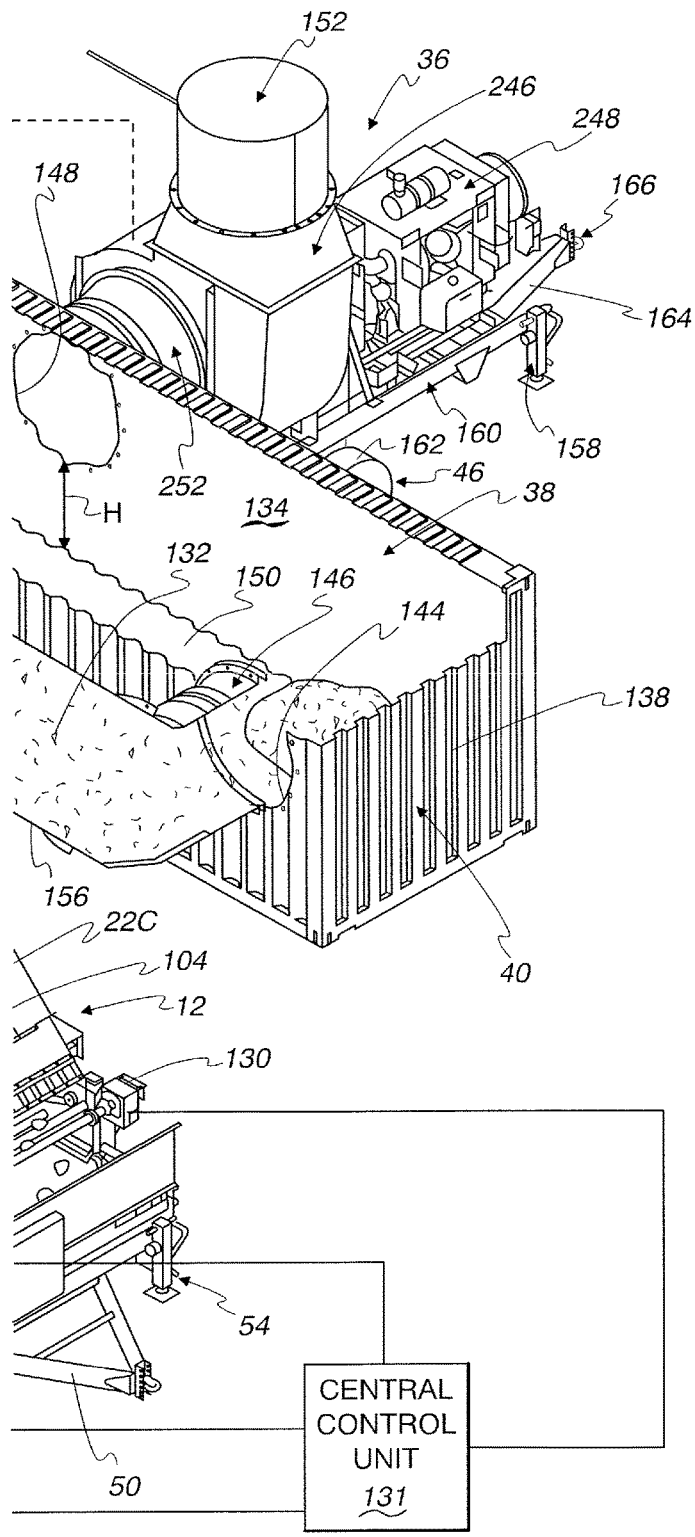

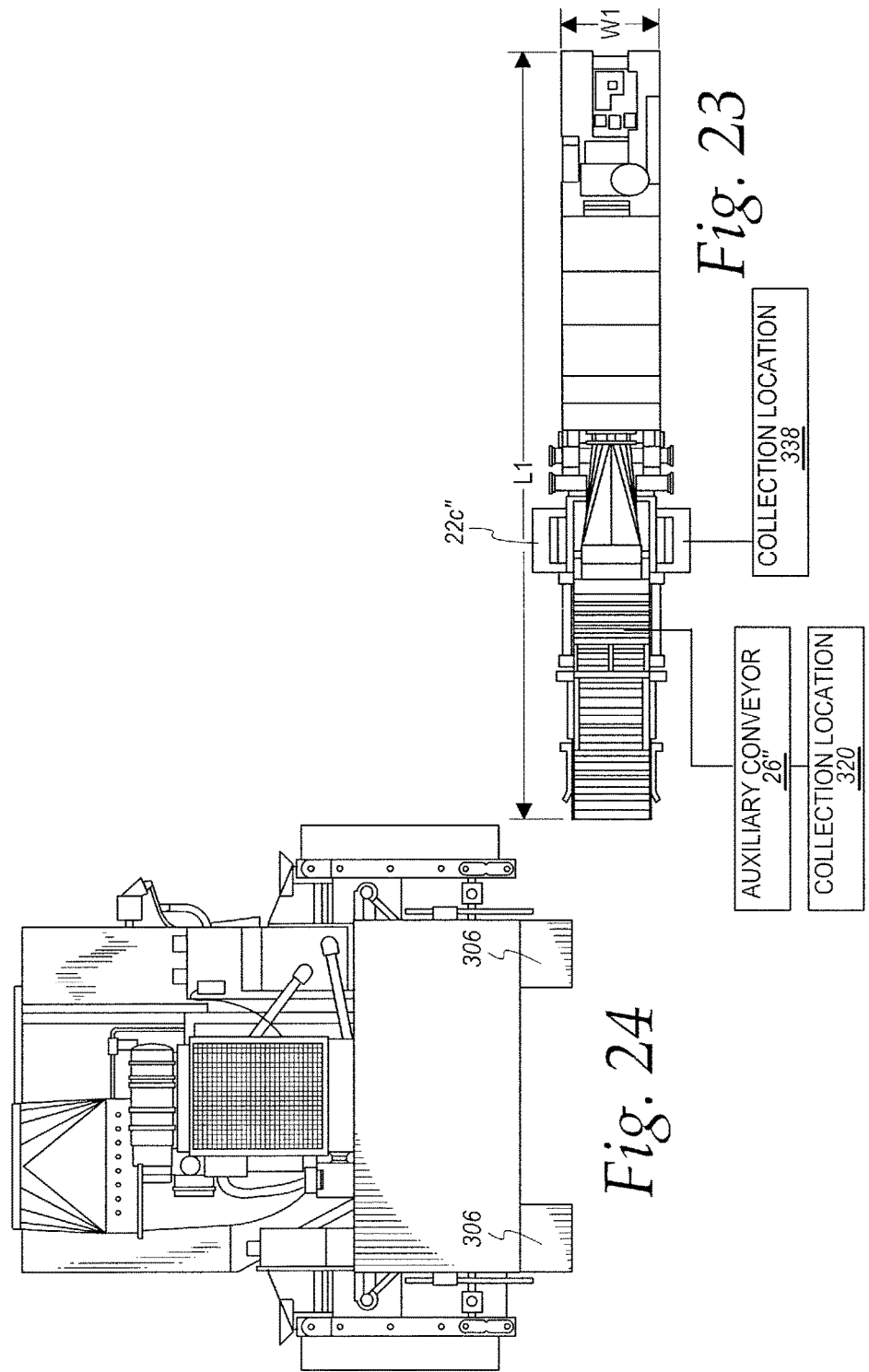

APPARATUS FOR SEPARATING USABLE CROP FROM INTERMIXED DEBRIS

CROSS-REFERENCE TO RELATED APPLICATIONS

This application is a continuation-in-part of U.S. patent application Ser. No. 14/630,723 filed Feb. 25, 2015.

BACKGROUND OF THE INVENTION

Field of the Invention

This invention relates to crop harvesting and, more particularly, to an apparatus through which usable crop can be separated from debris such as dirt, rocks, vines, corn stalks, crowns, etc.

Background Art

Efficient and effective separation of a usable crop from field debris remains an ongoing challenge in the agricultural industry. Apparatus used for crop separation are generally developed with the following design objectives: a) maximum separation of debris from usable crop while minimizing crop damage; b) accommodating different types of debris that might be encountered in different geographical areas and with different field makeups—namely, dirt and clay, small and potentially large rocks, vines, corn stalks, crowns, etc.; c) accumulating separated debris in a controlled manner so that staged debris can be appropriately handled after a field operation is concluded, as by onsite disposal or relocation; d) providing an overall system that is affordable to users with a range of different volume requirements; e) providing an overall system that has components capable of being transported to different sites, as within a user's field and between fields using public right-of-ways; and f) providing an overall system that can be easily and efficiently operated by a limited number of personnel in a manner that is safe for the operators and so that there is a minimal impact on the environment around the system.

Many existing systems have been designed that focus on one or more of the above objectives. However, after many decades of evolution, improvements remain necessary. This is particularly the case since competition challenges all in the agricultural industry to effect crop separation more effectively and efficiently while controlling overall operational costs.

Some of the specific design challenges can be identified relative to the harvesting of potatoes. Mixed potatoes and debris that are delivered for separation may contain: a) dirt, sand, clay, etc., that may be in different forms with different consistencies and adhered to the potatoes with different tenacity; b) vines; and c) rocks of different size, shape, and composition, with sizes ranging from small pebbles to large boulders. Conventional systems generally are not capable of accommodating all different types of debris and, as a result, generally either the fully processed crop remains intermixed with a significant amount of debris and/or system operators must manually perform steps during the separation process to maximize results. The latter may necessitate interruption of the processing, which compromises efficiency.

Systems not equipped to accommodate certain types of debris, such as large boulders, may become jammed or, in a worst case, damaged during normal operations. In either case, processing may be interrupted for potentially significant time periods to allow the problems to be alleviated. Undue progressive wear may lead to more regular maintenance and potentially extensive repairs.

Certain prior systems have utilized pressurized fluid and vacuum to reposition crop and debris during a separation process. These systems create their own inherent challenges, particularly integrating the same with conventional separation components. Further, such systems entrain dust particles in the air around the system which must be controlled to create a safe environment for operators and also allow an appropriate accumulation and/or disposal.

Another challenge to those designing this type of agricultural equipment is making the same transportable in a practical manner from one location to the next. This movement of equipment may involve relocation in the same field or relocation that requires the use of a public right-of-way. While having the system made up of multiple independent components may afford the ability to conveniently move these individual components, such an exercise introduces the problem of having to disconnect and reconnect components each time a relocation is undertaken. This may be labor intensive and time consuming, again requiring the use of valuable time in a limited harvesting window. Further, transporting of several components may necessitate multiple trips or use of multiple vehicles. Both options may be inefficient.

The challenges to equipment designers in the agricultural industry continue to even a greater extent to this day.

SUMMARY OF THE INVENTION

In one form, the invention is directed to an apparatus for separating usable crop from intermixed debris. The apparatus includes: a movable support; a conveying system on the movable support configured to convey usable crop in a processing path from an upstream input location to a downstream output location; at least a first separating system on the movable support configured to cause separation of debris intermixed with usable crop in a first manner as usable crop is conveyed in the processing path; a vacuum system on the movable support downstream of the first separating system and configured to generate a low pressure volume which causes additional debris intermixed with the usable crop to be drawn away from the usable crop by vacuum; and a collection container on the movable support configured to accumulate debris drawn away from the conveying usable crop. The movable support, conveying system, at least first separating system, vacuum system, and collection container define a unit that can be moved to relocate the apparatus.

In one form, the movable support has a frame with wheels that can be rolled against underlying terrain to relocate the apparatus.

In one form, the movable support has a component that is configured to be hitched to a towing vehicle that is usable to move the apparatus.

In one form, the apparatus further includes an evacuating system on the movable support. The evacuating system is configured to create a low pressure volume in a space in the collection container.

In one form, the apparatus is configured so that the low pressure volume which causes additional debris intermixed with the usable crop to be drawn away from the usable crop is created by the evacuating system.

In one form, the movable support has a length between upstream and downstream ends. The processing path has at least a portion that extends substantially in a line from the upstream end towards the downstream end. The apparatus has a housing with a chamber through which the processing path extends. The vacuum system generates the low pressure volume within the housing chamber. The collection container is downstream of the housing.

In one form, the apparatus further includes an evacuating system on the movable support. The evacuating system is downstream of the collection container and configured to create a low pressure volume in a space in the collection container.

In one form, the apparatus further includes a funneling conduit that directs debris from the housing chamber in a downstream direction into the collection container.

In one form, the apparatus further includes a delivery unit on the movable support that is configured to continuously direct a supply of intermixed debris and usable crop to the upstream input location.

In one form, the at least first separating system includes a second separating system spaced along the processing path from the first separating system and configured to cause separation of debris intermixed with usable crop in a second manner that is different than the first manner.

In one form, the conveying system is made up of a plurality of cooperating, independently operating, conveying sections.

In one form, the apparatus further includes at least one auxiliary conveyor on the movable support configured to intercept downwardly traveling debris and convey intercepted downwardly traveling debris towards a collection location.

In one form, the housing has a top opening. The vacuum system has an evacuating system that is in communication with the top opening.

In one form, the conveying system has at least one discharge conveying section that receives advancing usable crop after debris is separated from the advancing usable crop by the at least first separating system. The at least one discharge conveying section directs received advancing usable crop transversely to the length of the movable support to a collection location.

In one form, the movable support has first and second platforms at different heights. The collection container is supported on the first platform. The housing is supported on the second platform.

In one form, the collection container has an outer perimeter. The first platform is configured to define an upwardly facing walking surface around at least a part of the outer perimeter of the collection container.

In one form, the apparatus further includes an evacuating system on the movable support. The evacuating system is configured to create a low pressure volume in a space defined by the collection container and bounded by a floor. The collection container has spaced first and second openings. The first opening receives debris from the housing chamber. The second opening is in communication with the evacuating system. Each of the first and second openings is spaced above the floor so that a substantial height of debris can be accumulated upon the floor without obstructing the first or second openings.

In one form, the movable support has a frame with wheels that can be rolled against underlying terrain to relocate the apparatus. The movable support frame further includes a component at the downstream end of the movable support that is configured to be hitched to a towing vehicle that is usable to move the apparatus.

In one form, the apparatus is configured to cause the usable crop to move in opposite directions over different parts of the processing path.

In one form, the apparatus has a length and width that allow the apparatus to be towed on a public right-of-way.

BRIEF DESCRIPTION OF THE DRAWINGS

FIG. 3 is, FIGS. 3A and 3B are an enlarged, perspective view of the apparatus/system in FIG. 2 with components therein in an assembled state;

FIG. 23 is a reduced, plan view of the system/apparatus shown in FIGS. 21 and 22; and FIG. 24 is an enlarged, front elevation view of the system/apparatus in FIGS. 21-23.

DETAILED DESCRIPTION OF THE PREFERRED EMBODIMENT

Figure 1:
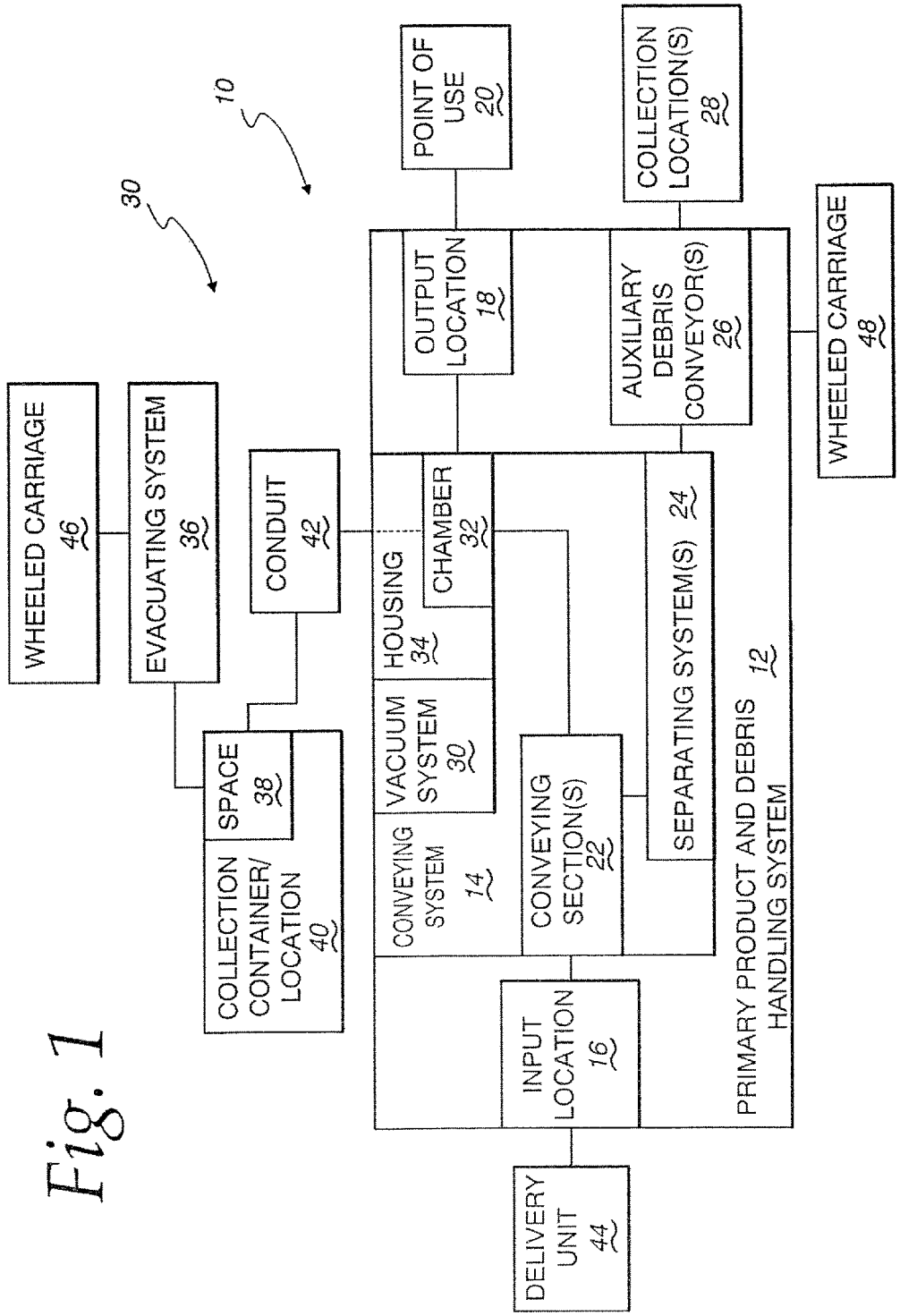
FIG. 1 is a schematic representation of a system/apparatus for separating usable crop from intermixed debris, according to the present invention.

In FIG. 1, a system/apparatus for separating usable crop from intermixed debris, according to the present invention, is shown in schematic form at 10. The apparatus 10 consists of a primary product and debris handling system 12 on which a conveying system 14 is provided. The conveying system 14 is configured to convey usable crop in a processing path from an upstream input location 16 to a downstream output location 18. From the output location 18, the crop can be staged, packaged, or otherwise processed at a point of use 20. The conveying system 14 is made up of a plurality of cooperating conveying sections 22.

The conveying system 14 further includes a plurality of separating systems 24 configured to cause separation of debris intermixed with usable crop as the usable crop is conveyed in the processing path. The separating systems 24 convey separated debris to auxiliary conveyors 26 that deliver the debris to one or more collection locations 28.

The apparatus 10 further includes a vacuum system 30 that is shown to include components that are part of the primary product and debris handling system 12 and components separate therefrom. The entire vacuum system 30 might be incorporated into the primary product and debris handling system 12.

The vacuum system 30 is preferably provided downstream of at least one separating system 24 and is configured to generate a low pressure volume within a chamber 32 bounded by a housing 34. The low pressure volume creates vacuum that draws debris away from the conveying, usable crop, and further assists in advancing the usable crop into the chamber 32 through which the processing path extends to the output location 18.

In the depicted embodiment, the vacuum system 30 consists of an evacuating system 36 that produces low pressure in a space 38 within a container 40 that defines a debris collection location. The space 38 is in communication with the chamber 32 and the housing 34 through a conduit 42. A low pressure volume is created in the chamber 32 through the conduit 42. Separated debris in the housing chamber 32 is caused to move in an accelerated air volume, generated by the evacuating system 36, through the conduit 42 and accumulate in the space 38 in the collection container 40.

As depicted, each of the conduit 42, collection container 40, and evacuating system 36 is separate from the system 12. As noted above, this is not a requirement.

A delivery unit 44 is used to continuously direct a supply of intermixed debris and usable crop to the input location 16. The delivery unit 44 may be integrated into the system 12 or separately constructed.

The depicted evacuating system 36 can be separated from the collection container 40 and is provided with a wheeled carriage 46 to facilitate its transportation to and from, and around, a site at which the apparatus 10 is used.

The primary product and debris handling system 12 is likewise provided with a wheeled carriage 48 to facilitate its transportation to and from, and around, an operating site.

The schematic representation of the apparatus 10 is intended to encompass the components in the exemplary apparatus described herein, as well as virtually an unlimited number of variations of those components and their interactions that would be obvious to one skilled in the art with the teachings of the present invention in hand. The embodiments described below are exemplary in nature only and should not be viewed as limiting.

Figure 2:
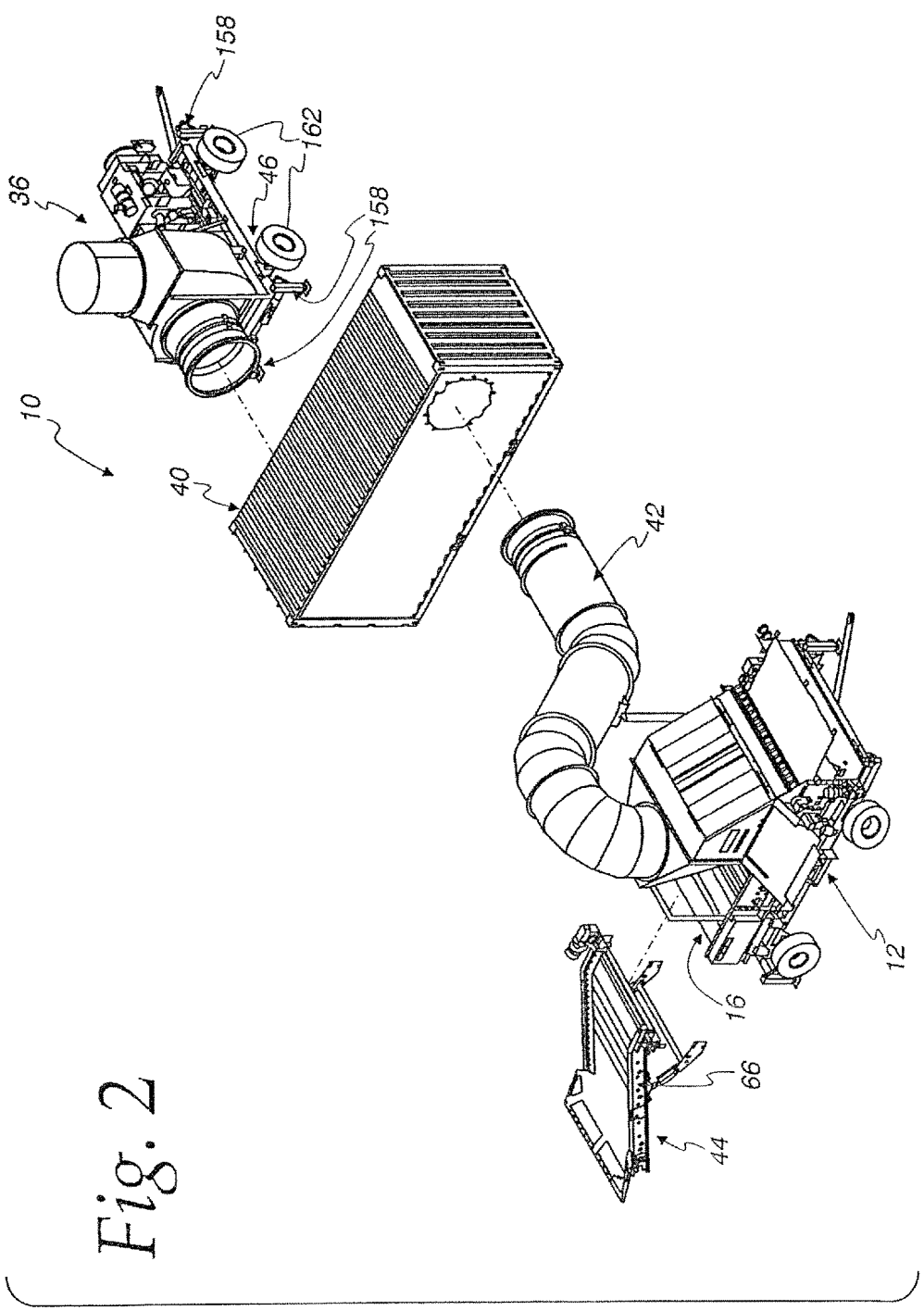
FIG. 2 is an exploded, perspective view of one specific form of system/apparatus, as shown in FIG. 1, and including a primary product and debris handling system, a delivery unit for inputting usable crop mixed with debris, a collection container for debris, and an evacuating system for generating a low pressure volume to control movement of crop and debris.

Before getting into the details of certain of the components making up the exemplary form of the specific system/apparatus 10 shown herein, the basic structure and overall operation of the apparatus/system 10 will be generally described with reference to FIGS. 2-4.

In the depicted exemplary embodiment of the inventive apparatus 10, the primary product and debris handling system 12 is combined with the delivery unit 44. Together these components are supported on the wheeled carriage 48 which has a towing tongue 50 with a hitch component at 52 that can be engaged with a drawing vehicle (not shown). Ideally, the combined dimension of the components on the wheeled carriage 48, and the wheeled carriage 48 itself, is such that travel on public right-of-ways is permitted.

Adjustable feet 54 are provided to selectively and separately elevate and lower the corners of a frame 56 upon which wheels 58 are provided. This allows on site levelling and stabilization of the frame 56 and the components supported thereon.

The delivery unit 44 consists of a conveying component 60 that moves in an endless path around end rollers 62, 64 mounted on a main frame 66. The frame 66 is mounted to the frame 56 so as to pivot relative thereto selectively around a horizontal and laterally extending axis, as indicated by the double-headed arrow 68, to allow an inclination angle α of an upwardly facing surface 70 on the conveying component 60 to be selectively varied, as through an extendible, manually operated cylinder 72. Remote and automated adjustment are also contemplated.

A mixture of usable crop and debris, shown at 74, is introduced in bulk at an upstream end 76 of the delivery unit 44. The mixture 74 travels progressively forwardly and upwardly to a downstream discharge end 78 of the delivery unit 44 at which the mixture 74 falls under its own weight to a lower unit at 80 that functions as both a conveying section 22a and a separating system 24a. The unit 80 is made up of a plurality of intermeshing, parallel, cleaning rollers 82, 84, and an intermediate control cylinder 88 which cooperatively function as a "cleaning table" that removes excess dirt, vines, and other trash. The rollers 82, 84 and cylinder 88 cooperate to create gaps between which small/flat rocks can drop through. By controlling the vertical relationship between the rollers 82, 84 and cylinder 88, a "stall point", at which an accumulated flow is blocked, can be increased/decreased.

Figure 4A:
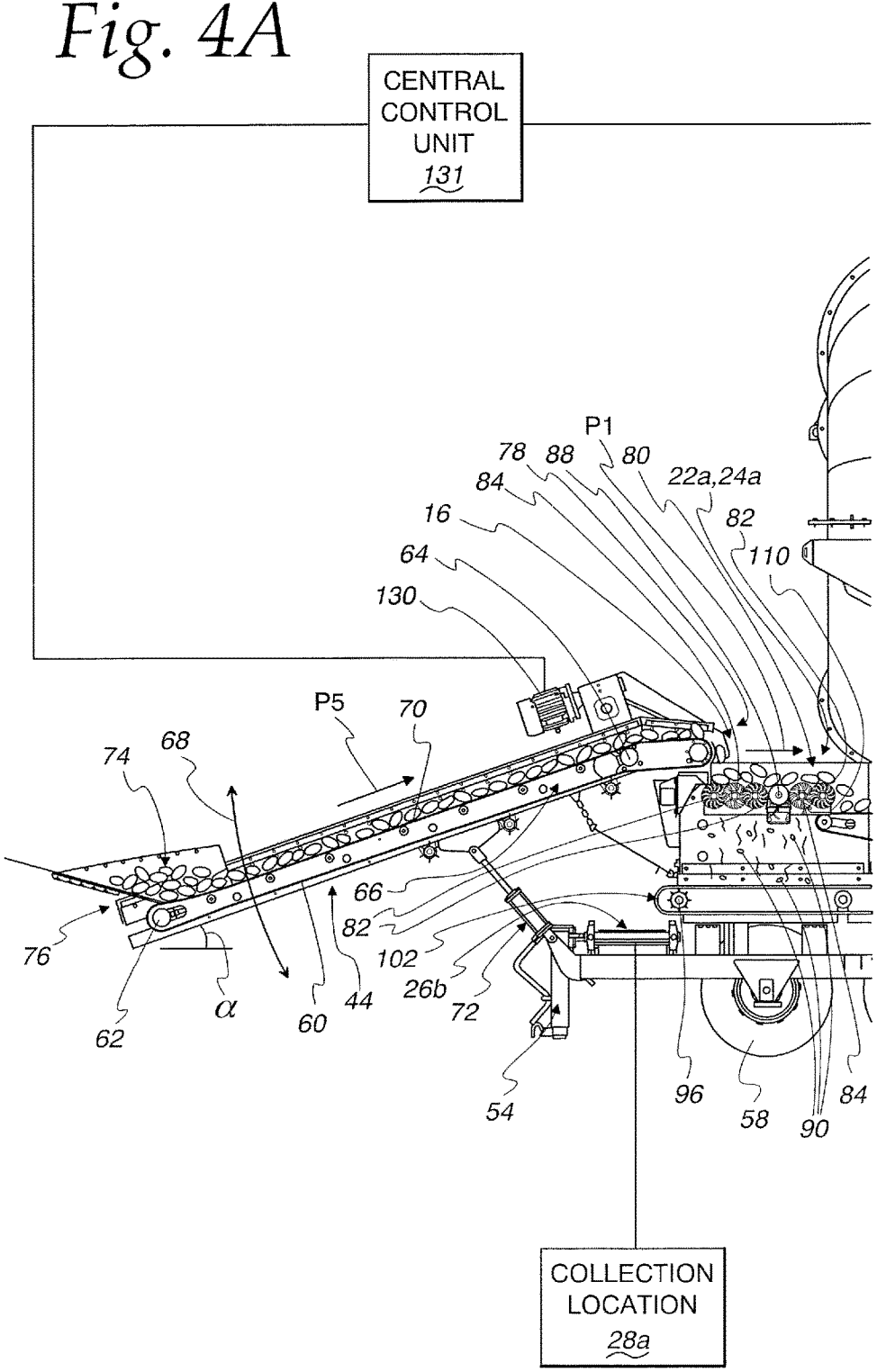
FIGS. 4A and 4B are a side elevation view of the system/apparatus in FIG. 3.
Figure 4B:
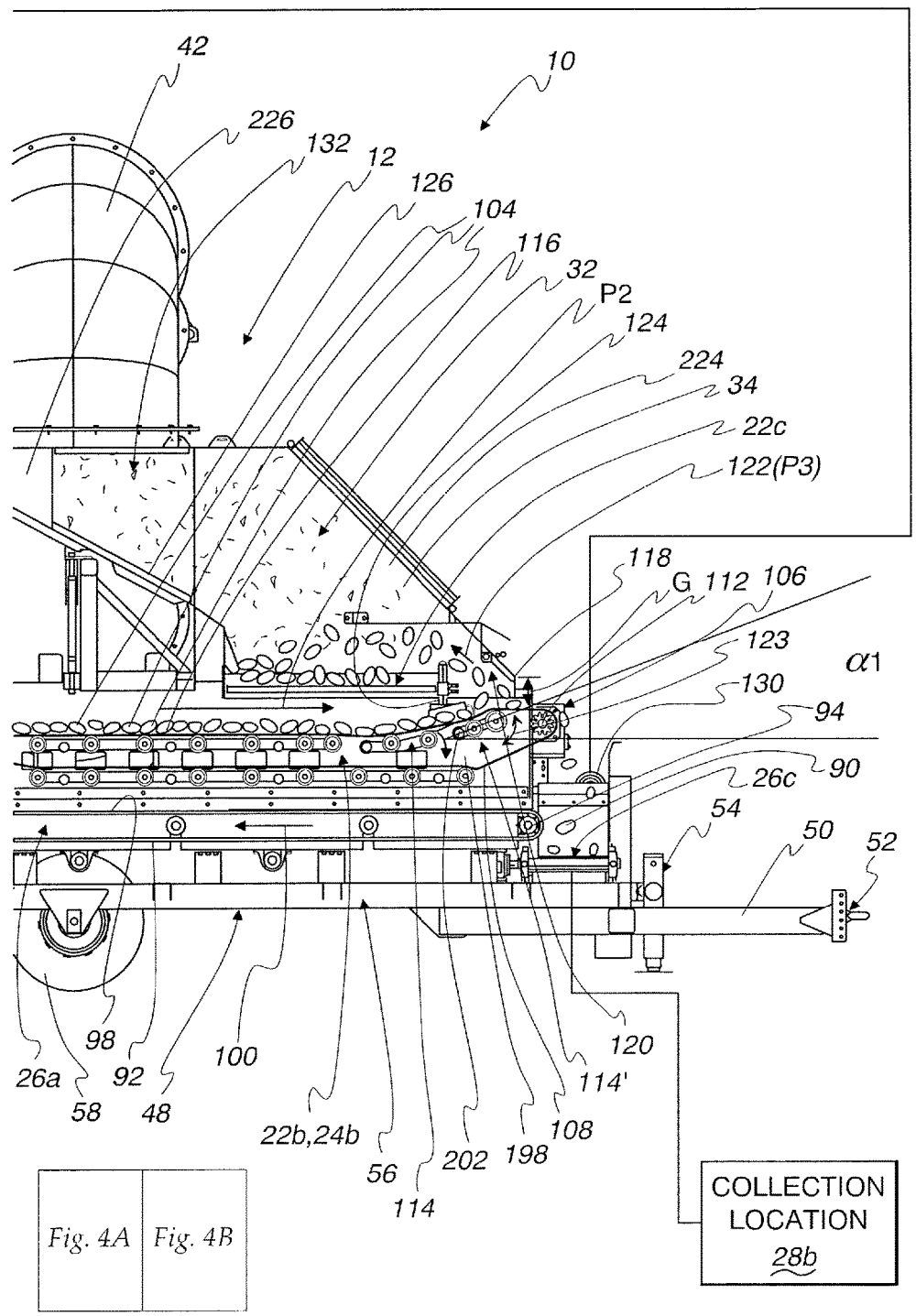

As seen in FIG. 4, rocks 90 that pass between the rollers 82, 84 and cylinder 88 are intercepted by a debris conveyor 26a that consists of an endless conveying component 92 trained around end rollers 94, 96. An upwardly facing surface 98 on the conveying component 92 advances the rocks 90, and potentially other debris passing through the rollers 82, 84 and cylinder 88, rearwardly in the direction of the arrow 100. This debris is advanced over an end 102 of the auxiliary conveyor 26a and falls therefrom under its own weight to an additional auxiliary conveyor 26b, which advances the accumulated debris laterally to a desired collection location 28a.

The usable crop 104 (shown as but not limited to potatoes), with at least some of the debris from the mixture 74 removed, continues to beyond the unit 80 to a further conveying section 22b, which also functions as a separating system 24b. The conveying section 22b is reconfigurable adjacent its downstream end 106.

More specifically, the conveying section 22b consists of an endless conveying component 108 trained about a series of rollers including end rollers 110, 112, with the latter elevated above the former. The rollers 110, 112 turn around substantially parallel, horizontal axes. In addition to the end rollers 110, 112, there is a plurality of intermediate support rollers/roller assemblies, including separate support roller assemblies at 114, 114' that function independently and are configured to locally change the inclination angle and height of an upwardly facing surface 116 on the conveying component 108 in the vicinity of where the conveying crop 104 is diverted progressively upwardly towards the end 106.

The support roller assembly 114' is configured so that a variable gap G is formed between the surface 116 overlying the support roller assembly 114' and a lower edge 118 of the housing 34 bounding an inlet 120 to the chamber 32 bounded by the housing 34. The air velocity at the inlet 120 to the chamber 32 is adequate to draw the crop 104 off of the conveying surface in the direction of the arrow 122 into the chamber 32 towards and onto a further conveying section 22c. Rocks 90 can pass between the edge 118 and upwardly facing surface 116 to be directed past the end 106, whereupon they fall under their weight to an auxiliary conveyor 26c. Through the auxiliary conveyor 26c, this debris can be controllably directed to a separate collection location 28b.

The support roller assembly 114' is pivotable about a horizontally and laterally extending axis, as indicated by the double-headed arrow 123, to change an inclination angle $\alpha 1$ of the upwardly facing surface 116 under the inlet 120, thereby varying the angle at which the crop advances towards the inlet 120 and to a certain extent the suction applied to the crop at the inlet 120.

The upstream support roller assembly 114 is configured so that in response to the application of a predetermined downward force, as by a large anticipated rock size, the downstream end of the support roller assembly 114 will pivot downwardly around a horizontally and laterally extending axis to locally increase the vertical spacing between the upwardly facing surface 116 and a horizontally extending frame component 124 so that such a large rock can pass thereby in the processing path to move eventually off of the conveying section 22b to the auxiliary conveyor 26c. Once the weight of the rock(s) is removed, the support roller assembly will be biased to its resting state as shown in FIG. 4.

Once the crop 104 is drawn into the housing chamber 32, it is distributed across the width of the conveying section 22c. Additional loose debris is drawn upwardly by the airstream that creates the low pressure volume in the chamber 32 and guided by an inclined housing surface 126 through a top opening 127 in the housing 34 and into the conduit 42. The cleaned usable crop 104 conveys in the direction of the arrow 128 to the output location at 18 from where the crop 104 is delivered to the point of use 20, which as previously indicated, may be a staging location, one or more containers, etc.

Through the various conveying sections 22a, 22b, 22c, and the vacuum system 30, the usable crop 104 is caused to travel in a series of discrete path portions that together make up the overall processing path between the input location 16 and output location 18. The conveying section 22a defined by the unit 80 conveys the crop 104 in a path portion P1 that is substantially horizontal in a forward direction. The conveying section 22b conveys the crop 104 in a path portion P2 that is substantially parallel to the path portion P1. From the conveying section 22b, the vacuum system 30 causes the crop 104 to travel rearwardly in the direction of the arrow 122 that identifies a path portion P3. Once on the conveying section 22c, the usable crop 104 travels laterally in the direction of the arrow 128, which identifies the path portion P4.

The delivery unit 44 may also be considered to define part of the processing path, specifically causing the usable crop 104 to travel in a path portion P5 between the upstream end 76 and the input location 16 in a substantially straight line parallel to the path portions P1, P2.

The auxiliary debris conveyor 26a can be extended, as depicted, to underlie substantially the entire length of the conveying sections 22a, 22b/separating systems 24a, 24b, thereby to intercept separated debris passing off/through these conveying sections 22a, 22b/separating systems 24a, 24b.

The conveying components 60, 92, 108 are driven by motors 130 that allow for infinite speed control to maximize the processing capability based upon the nature of the crop and the encountered debris. The operation of all the motors 130 can be coordinated through a central control unit 131.

As mentioned above, the last stage of debris separation produces debris pieces 132 that become entrained in the air flow in the housing chamber 32. This debris 132 is drawn into the conduit 42 through the top housing opening 127 and, through the conduit 42, the debris 132 is delivered to the space 38 defined by the collection container 40.

In this embodiment, the collection container 40 has a generally square construction, though this is not a requirement. The depicted collection container 40 has a generally rectangular shape, as viewed in plan, with a pair of spaced side walls 134, 136 and shorter, spaced, end walls 138, 140. The end wall 140 is configured to gain access to the space 38. The end wall 140 may incorporate one or more movable doors D.

The side wall 136 has a first opening 144 formed therethrough to accommodate an end 146 of the conduit 42. A second opening 148 is formed through the side wall 134 to allow communication between the evacuating system 36 and the space 38.

Each of the openings 144, 148 is spaced a height H above a floor 150 of the collection container 40 upon which debris is progressively accumulated. The height H is selected so that a substantial quantity of debris can be accumulated upon the floor 150 without obstructing either of the openings 144, 148. The drop in air velocity generated by the evacuating system 36, below the openings 144, 148, allows the debris to settle into the space 38 below the openings 144, 148 while at the same time clean air is allowed to exhaust from the collection container space 38 through the opening 148 and discharge from an outlet conduit 152 to the atmosphere. As a result, substantially clean air is discharged to the surrounding environment while the majority of the debris is confined to within the space 38.

In a preferred form, the conduit 42 has an inverted "U" shape. The debris 132 is caused to be funnelled by the inclined housing surface 126, and an overall converging housing shape, into one leg 154 of the U. From the leg 154, the debris 132 travels in a downward path through the other leg 156 of the "U" and discharges into the space 38 through the first opening 144.

As noted above, the evacuating system 36 may be a self-contained unit separable from the collection container 40 and supported on the wheeled carriage 46.

Levelling feet 158 are provided on a frame 160 that is supported by the wheeled carriage 46. The levelling feet 158 can be used on a particular site to elevate the frame 160 off of carriage wheels 162, to stably support the evacuating system 36 in a desired orientation relative to the collection container 40.

The frame 160 has a towing tongue 164 with a hitch component 166 to engage a cooperating component on a drawing vehicle (not shown) used to transport the evacuating system 36.

Additional detail of certain components of the apparatus 10 will now be described. It should be understood that this detail is not critical to the present invention, but helpful in fully understanding the preferred form thereof.

Figure 5:
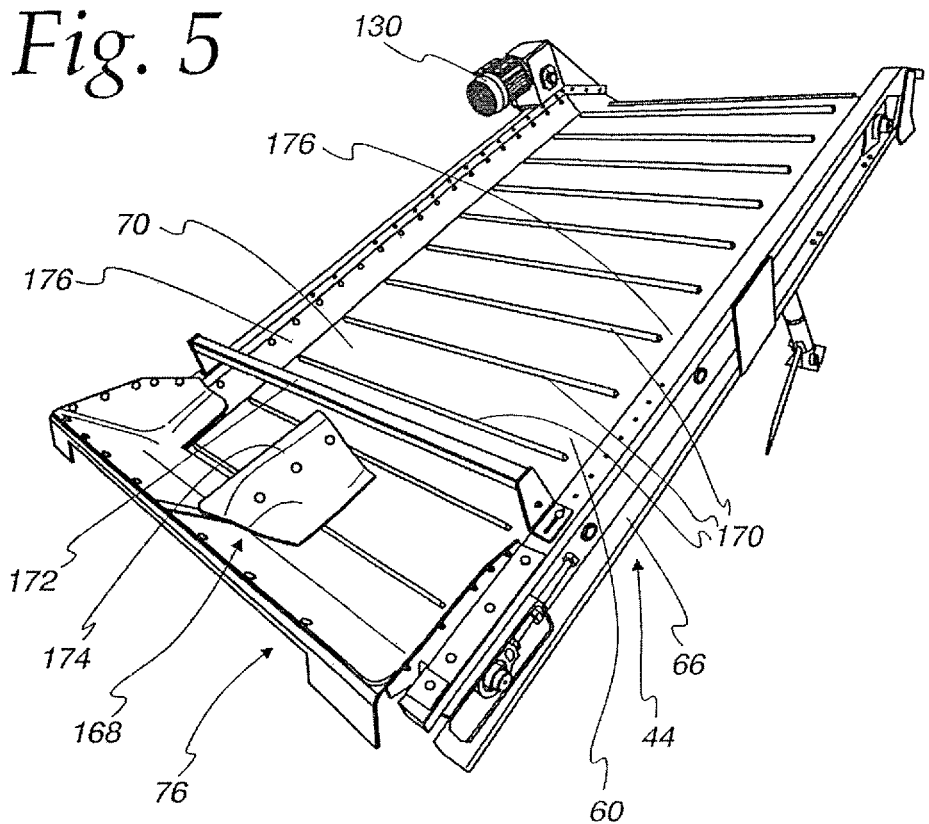
FIG. 5 is an enlarged, rear, perspective view of the delivery unit shown in the system/apparatus in FIGS. 2-4.

In FIG. 5, details of the delivery unit 44 are shown. At the upstream end 76, a funnelling wall 168 is provided to control and confine the introduced mixture 74. The introduced mixture 74 is guided thereby towards the conveying component 60. The conveying component 60 has laterally extending slats 170 projecting upwardly therefrom at regular intervals along the length of the conveying component 60. The slats 170 positively grip the mixture 74 as the conveying component 60 is advanced.

The frame 66 further comprises an inverted "U"-shaped height control bar 172 that defines, in conjunction with the upwardly facing conveying surface 70, a surrounded entry passage with a fixed area. This facilitates control of the volume of the mixture 74 being introduced to against the conveying surface 70.

A laterally centered, and inverted, "V"-shaped divider 174 disperses introduced mixture 74 evenly across the width of the conveying surface 70.

The mixture 74 is confined at the lateral ends of the surface 70 by flexible skirts 176.

Figure 6:
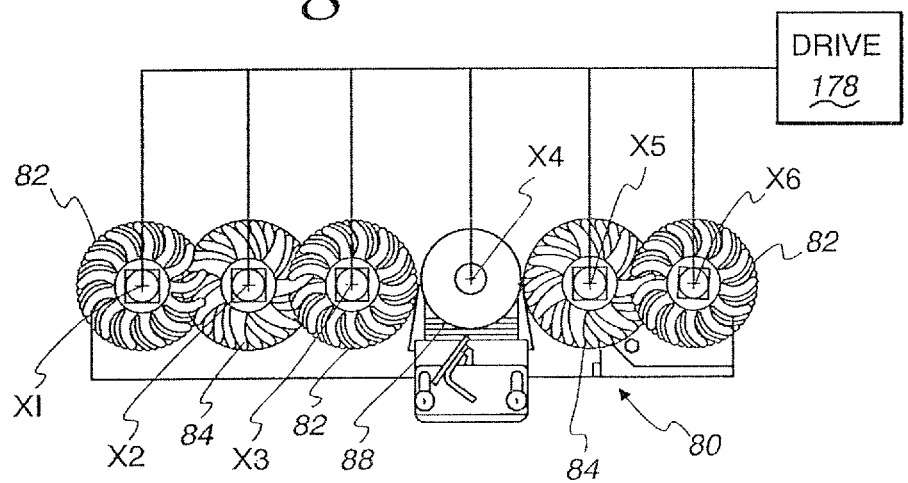
FIG. 6 is an enlarged, side elevation view of a unit on the primary product and debris handling system in FIGS. 2-4 that makes up a conveying section/separating system for debris.
Figure 7:
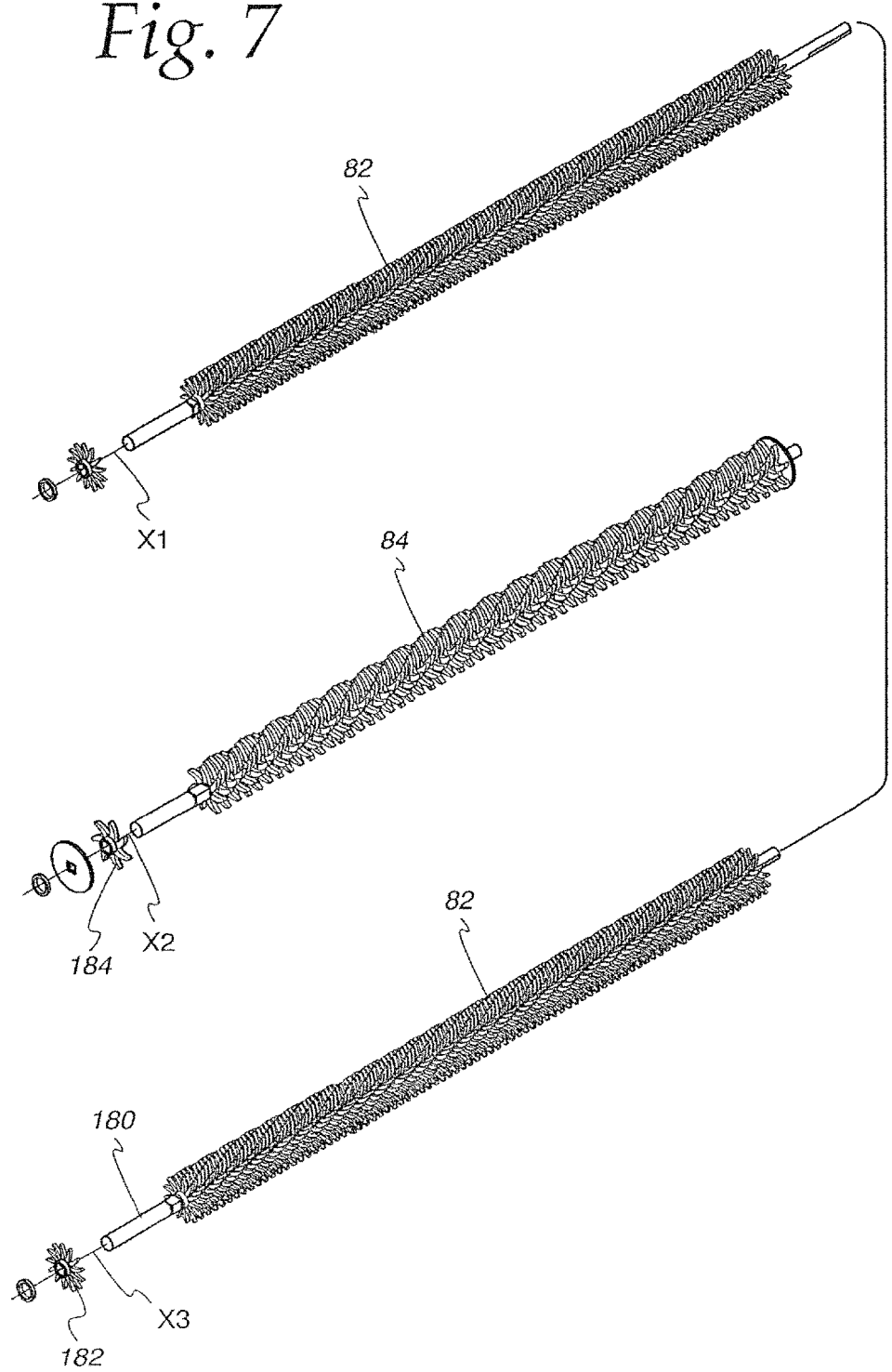
FIG. 7 is an enlarged, exploded, perspective view of cooperating rollers on the unit in FIG. 6.
Figure 8:
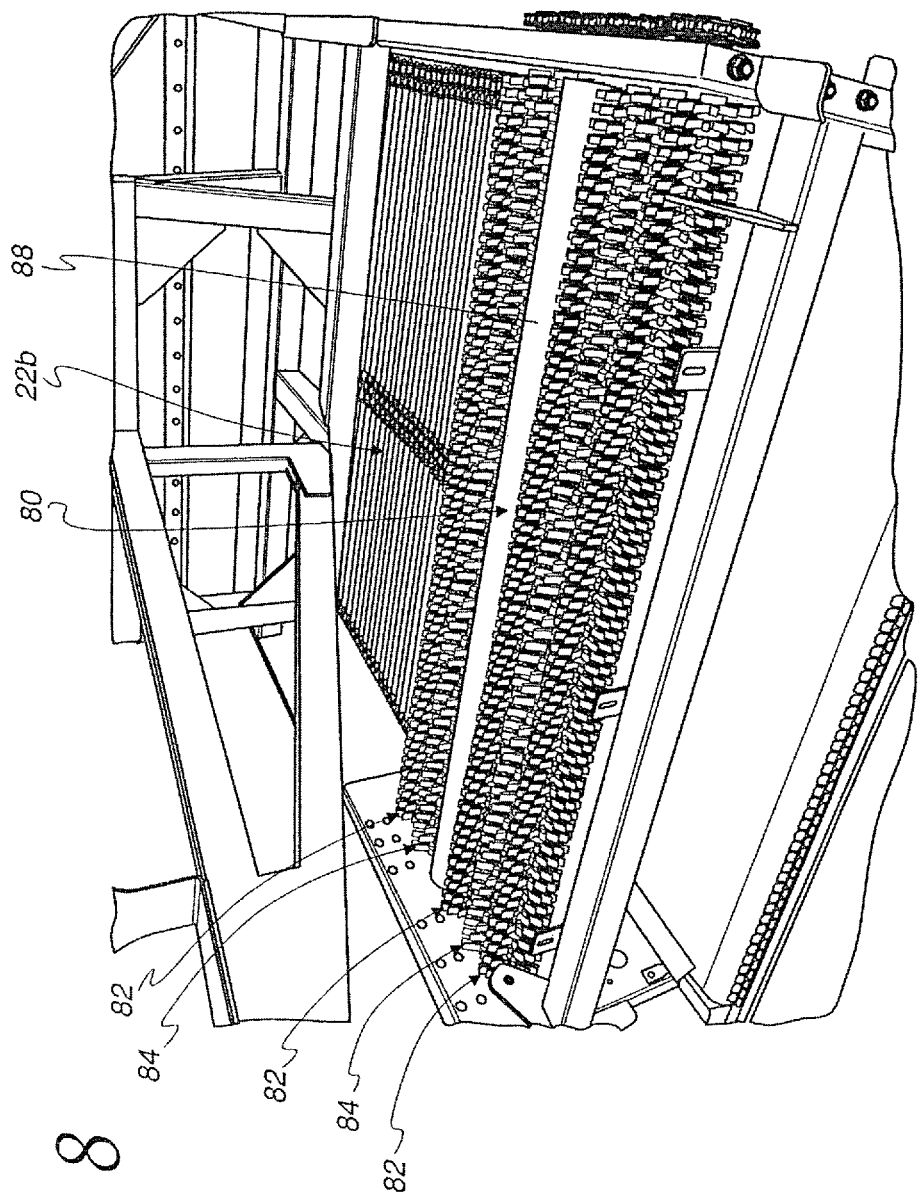
FIG. 8 is an enlarged, fragmentary, rear perspective view of the unit in FIGS. 6 and 7 on the primary product and debris handling system.

In FIGS. 6-8, additional detail regarding the unit 80 is shown. The unit 80 in this embodiment consists of three of the aforementioned rollers 82, two of the rollers 84, and the cylinder 88 between the rollers 82, 84 in the depicted combination. The rollers 82, 84 and cylinder 88 are rotatable about parallel axes X1, X2, X3, X4, X5 spaced so that the rollers 82, 84 are in mesh. The rollers 82, 84, 88 and cylinder 88 are simultaneously rotated by a drive 178.

The rollers 82 each is made up of a shaft 180 with fingered wheels 182 keyed to rotate therewith and be slidable axially therealong. The roller 84 has the same general construction with a different configuration for the fingered wheels 184 that can be arranged to cooperatively produce the depicted spiral shape. The rotating and meshed rollers 82, 84 cooperate to break loose excess dirt, vines, and other trash accompanying the usable crop 104. The meshed arrangement creates gaps/openings for small rocks/debris to pass downwardly therethrough.

The cylinder 88 can be moved vertically relative to the rollers 82, 84 to create a gap at the cylindrical roller 88 that allows small/flat rocks to drop therethrough. By adjusting the cylindrical roller 88 up or down, a "stall point" can also be adjusted for the incoming supply of crop 104 with intermingled debris. By changing the stall point, the residence time of the mixture 74 on the unit 80 can be selected to control the degree of cleaning and debris breakup performed by the unit 80.

In FIG. 8 the transition from the unit 80 to the conveying section 22b can be clearly seen.

Figure 9:
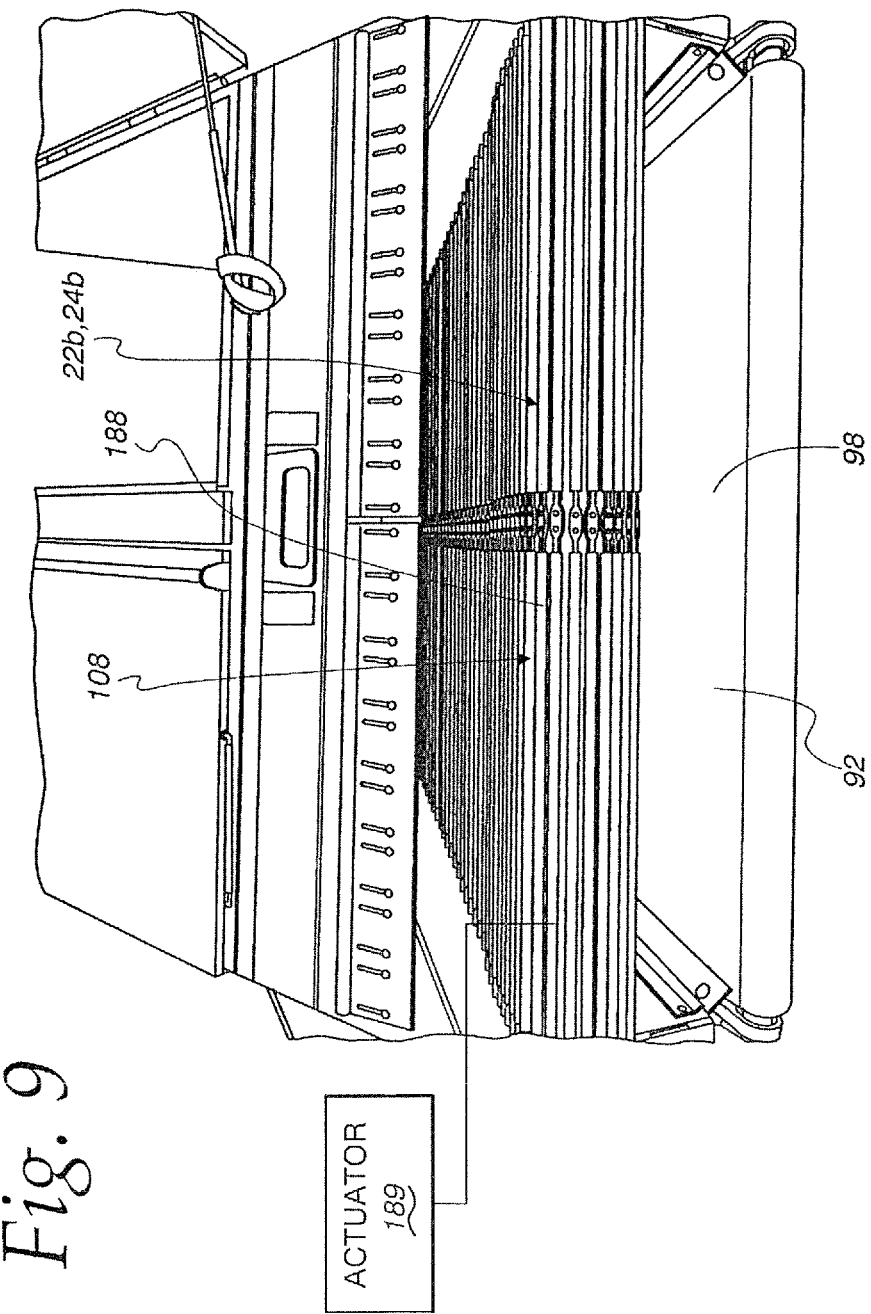
FIG. 9 is a view as in FIG. 8 and showing an additional conveying section/separating system on the primary product and debris handling system downstream of the unit shown in FIG. 8.

FIG. 9 shows the upstream end of the conveying section 22b/separating system 24b. The conveying component 108 is made from a series of elongate, laterally extending tubes 188 that are in parallel relationship with gaps therebetween that allow passage of small debris downwardly therethrough to the solid surface 98 of the conveying component 92 that is traveling in an opposite direction. The tubes 188 may be coated with rubber and may be shaken by an appropriate actuator 189 to enhance debris separation and release to the underlying auxiliary conveyor 26b.

Figure 10:
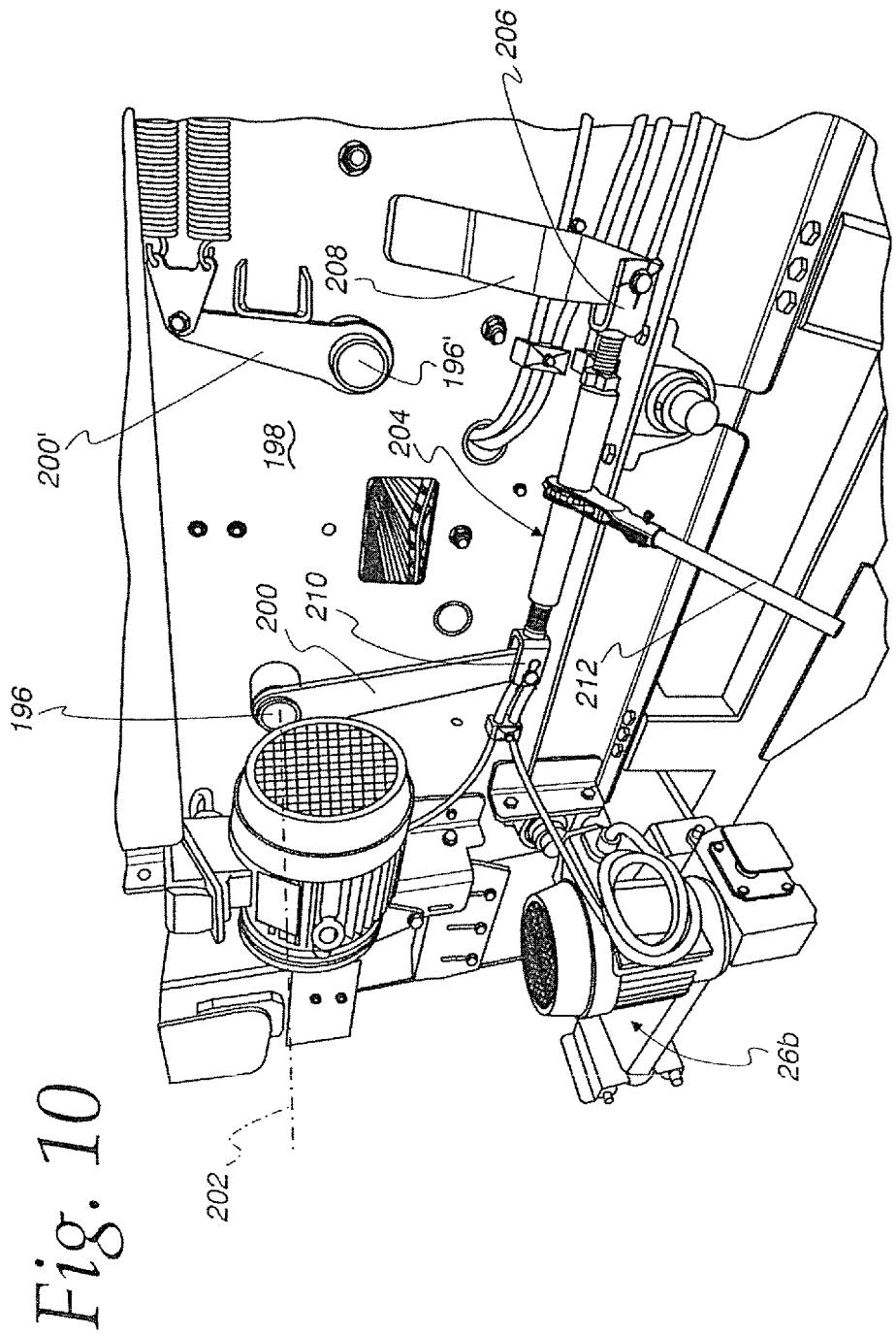
FIG. 10 is an enlarged, fragmentary, perspective view of structure for controlling separate support roller assemblies on the conveying section/separating system shown in FIG. 9.
Figure 11:
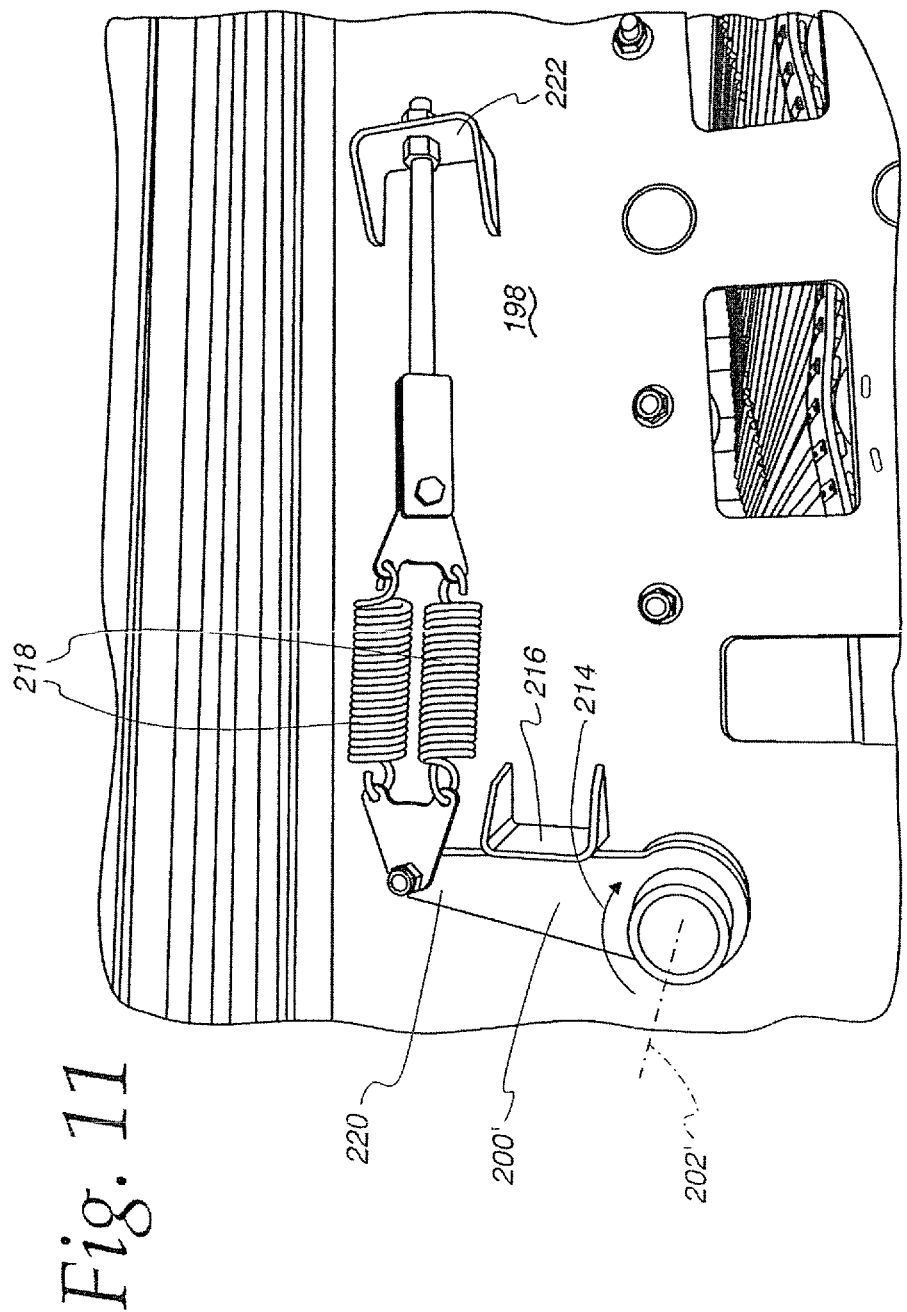
FIG. 11 is a view similar to that in FIG. 10 and showing the controlling structure associated with one of the support roller assemblies.
Figure 12:
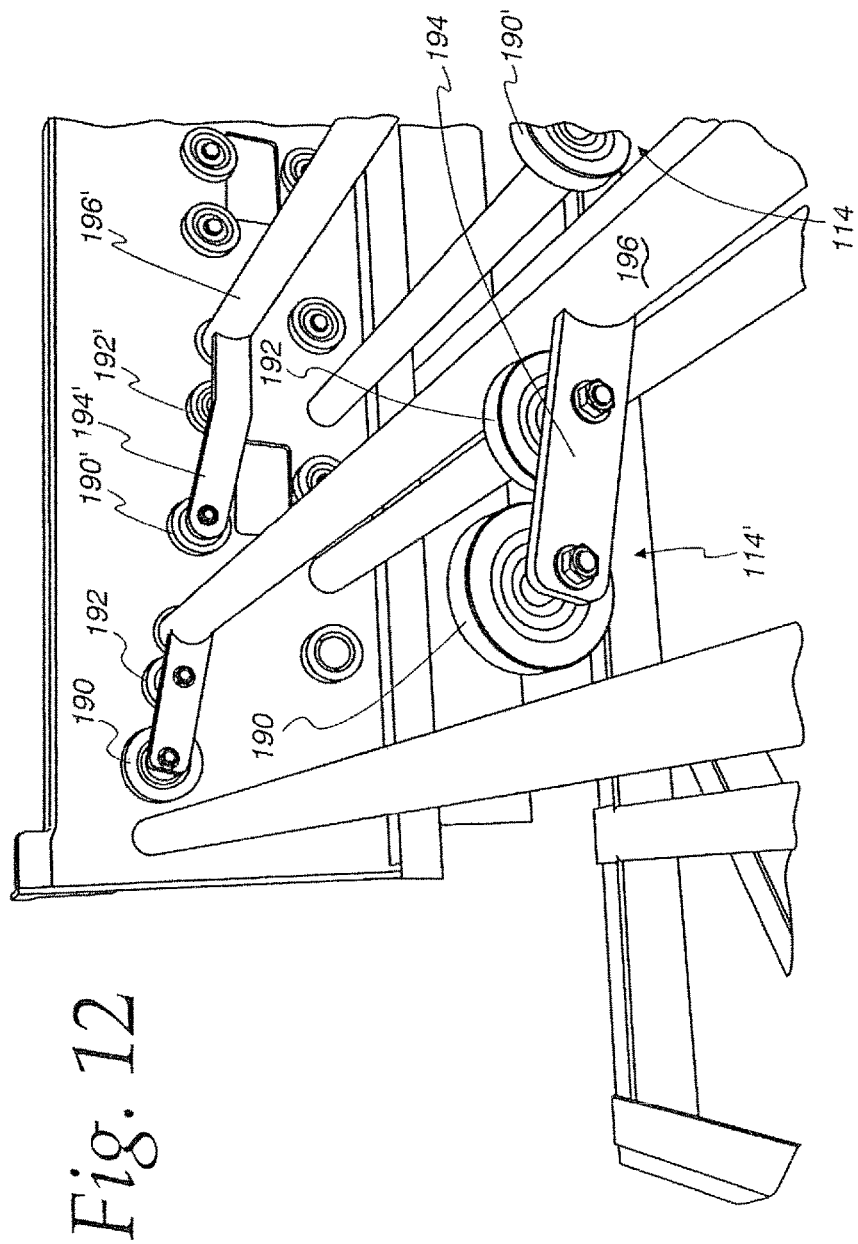
FIG. 12 is an enlarged, fragmentary, perspective view of the frame portion in FIGS. 10 and 11 and showing the support roller assemblies thereon.

In FIGS. 10-12, details for the support roller assemblies 114, 114', as seen also in FIG. 4, are shown. It should be mentioned that the various conveying sections 22 may utilize roller components, support roller assemblies, etc. of like construction at laterally spaced locations. The description herein is limited to the roller components/support roller assemblies at one such location.

The support roller assembly 114' has separate rollers 190, 192 supported on a cantilevered arm 194. The arm 194 extends from a tube 196 that projects through a frame part 198. An actuating arm 200 is connected to the projecting part of the tube 196. The tube 196, together with the arms 194, 200, pivots as a unit relative to the frame part 198 about a laterally extending axis 202.

The angular position of the actuating arm 200, and thus the arm 194 and associated rollers 190, 192, is controlled by a manually operated actuator at 204. The actuator 204 has an elongate configuration with one end 206 attached for pivoting relative to the frame part 198 through a bracket 208. The opposite end 210 is pivotably connected to the end of the arm 200, remote from the tube 196.

The actuator 204 utilizes cooperating threaded components that are relatively turned to change the effective length thereof. As depicted, this relative turning is accomplished through a hand-operable tool 212 which may utilize a ratchet arrangement. Alternatively, automated adjustment can be effected. By operating the actuator 204, the angle α1 of the incline of the conveying component 108 can be locally changed, thereby changing the angle at which the crop is advanced towards and through the chamber inlet 120. The spacing between the inlet 120 and the location on the conveying component 108 at which crop separates can also be controlled through this adjustment.

Upstream of the support roller assembly 14 is the aforementioned support roller assembly 114, which repositions under the weight of large rocks and the like. The roller assembly 114 has rollers 190', 192' carried on an arm 194' at each side of the conveying section 22b. The arms 194' have an associated tube 196' that projects through the frame part 198 and connects to an actuating arm 200'.

The arm 200' is normally biased around a pivot axis 202' in the direction of the arrow 214. As this occurs, the actuating arm 200' abuts to a stop element 216 fixed on the frame part 198 to consistently place the arm 200' and support roller assembly 114 in a relaxed/no load position, as shown in FIG. 4. A pair of tension coil springs 218 act between an end 220 of the arm 200' and a bracket 222 on the frame part 198 to draw the roller assembly 114 to its no load position.

Figure 13:
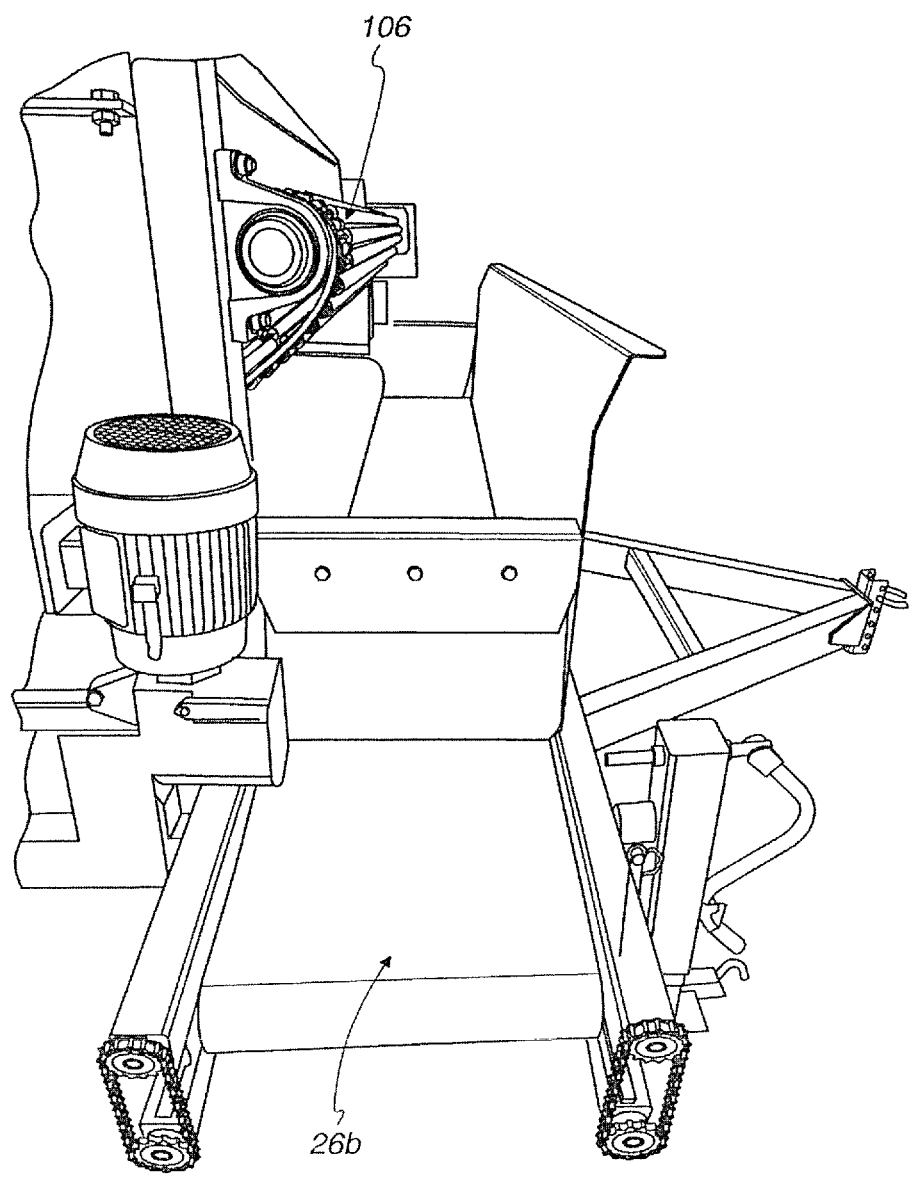
FIG. 13 is an enlarged, fragmentary, perspective view of an auxiliary conveyor for debris separated from the conveying section/separating system shown in FIG. 9.
Figure 14:
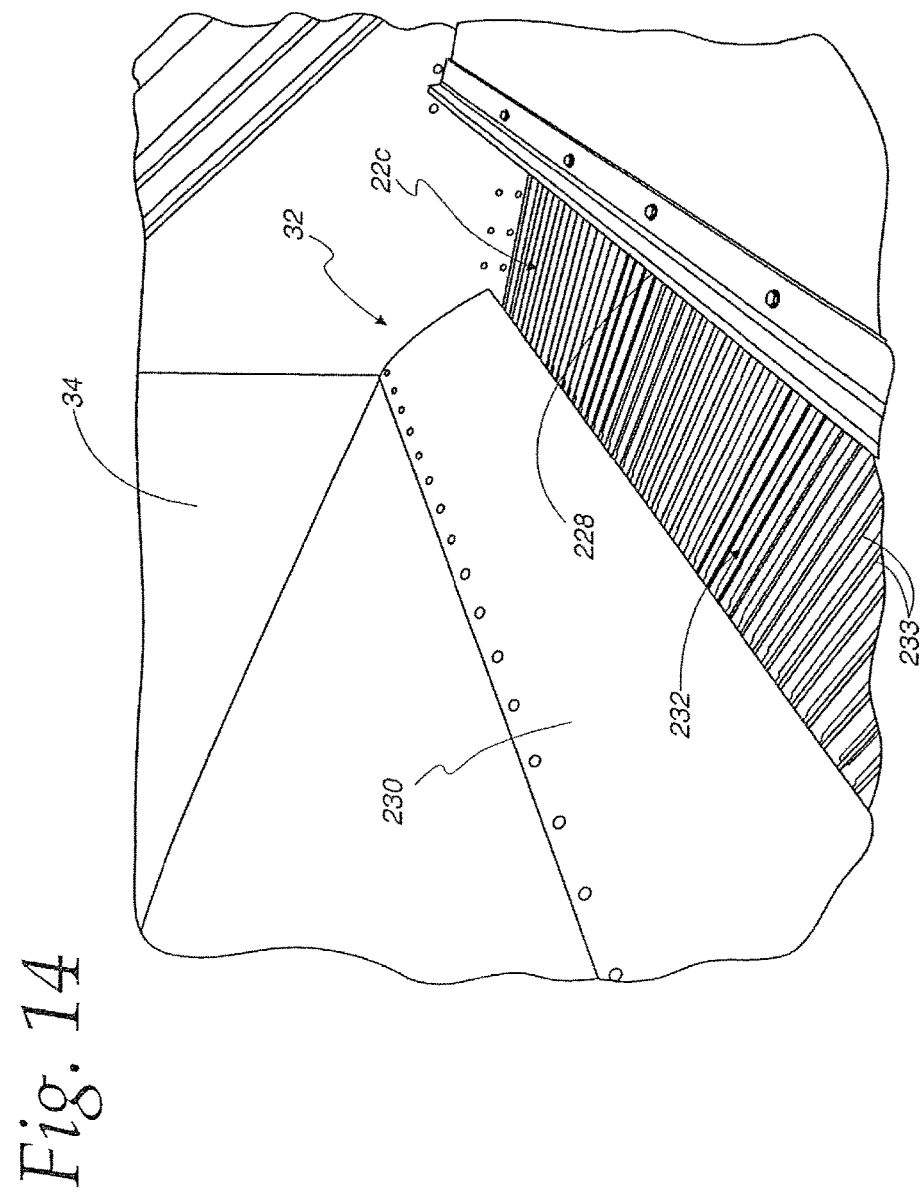
FIG. 14 is an enlarged, fragmentary, perspective view of the inside of a housing on the primary product and debris handling system within which the low pressure volume is generated to reposition crop and debris moving along the conveying section/separating system in FIG. 9.
Figure 15:
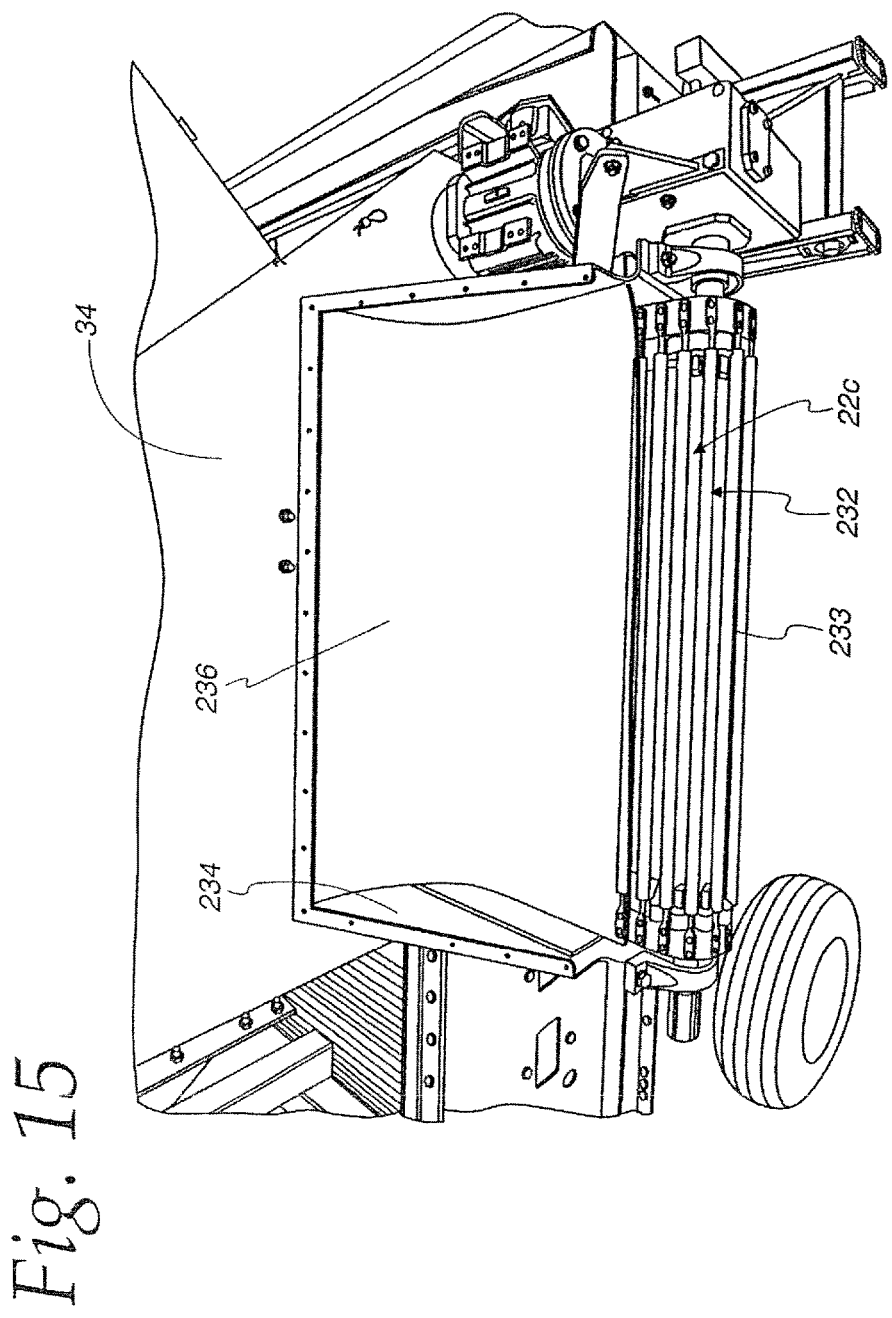
FIG. 15 is an enlarged, fragmentary, perspective view of an extension on the housing in FIG. 14 showing a shield associated with the underlying conveying section moving within the inside of the housing in FIG. 14.
Figure 16:
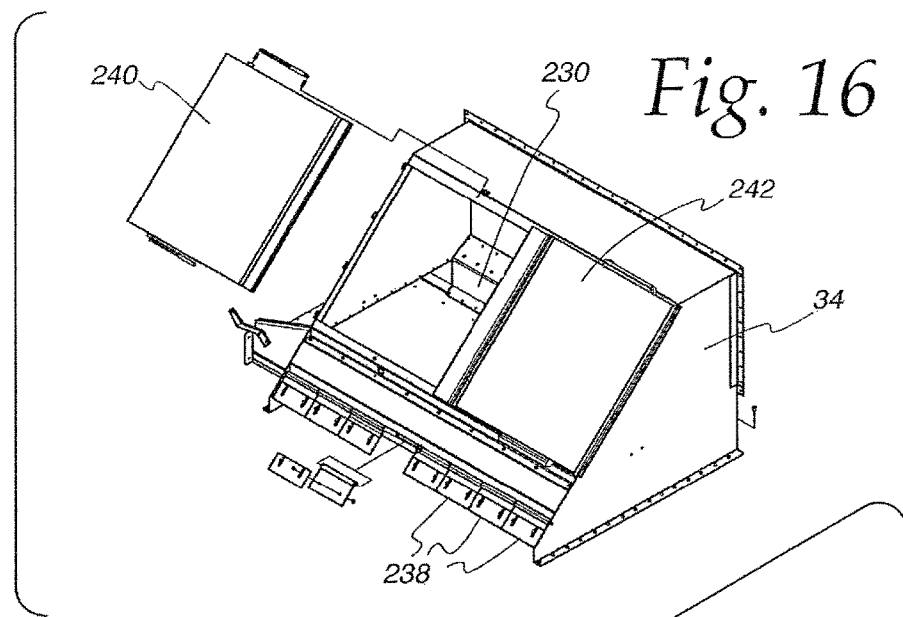
FIG. 16 is an enlarged, exploded, perspective view of the housing as shown in FIGS. 14 and 15.
Figure 17:
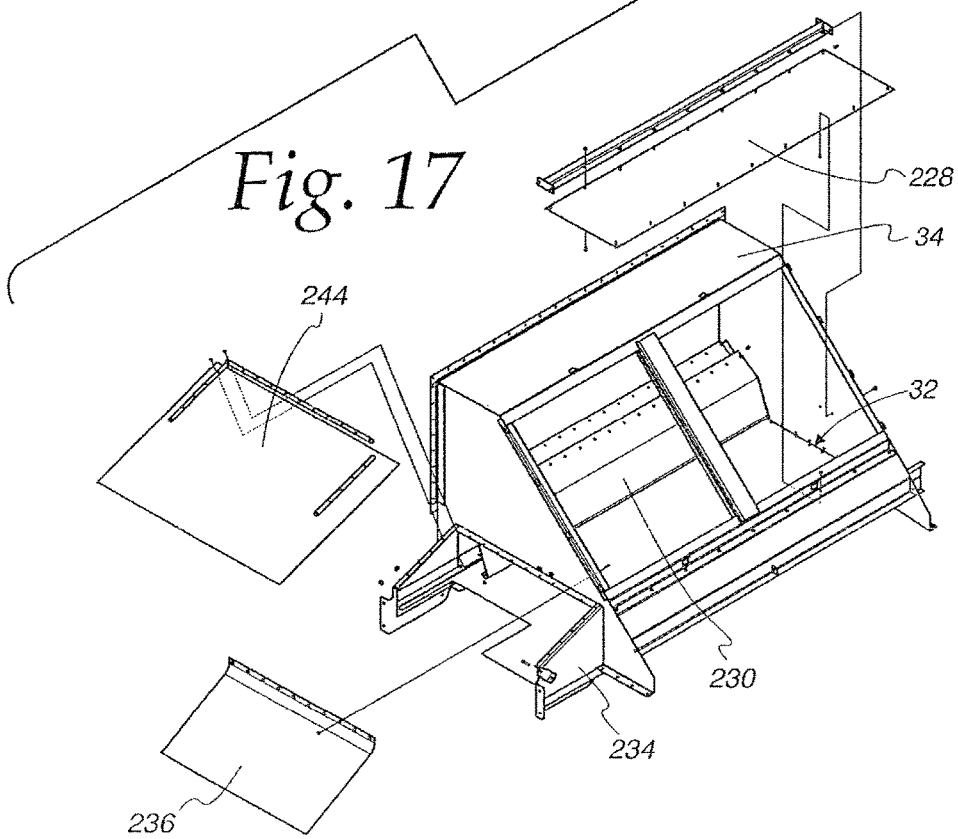
FIG. 17 is an enlarged, exploded, perspective view of the housing as shown in FIG. 16 and taken from a different perspective.
Figure 18:
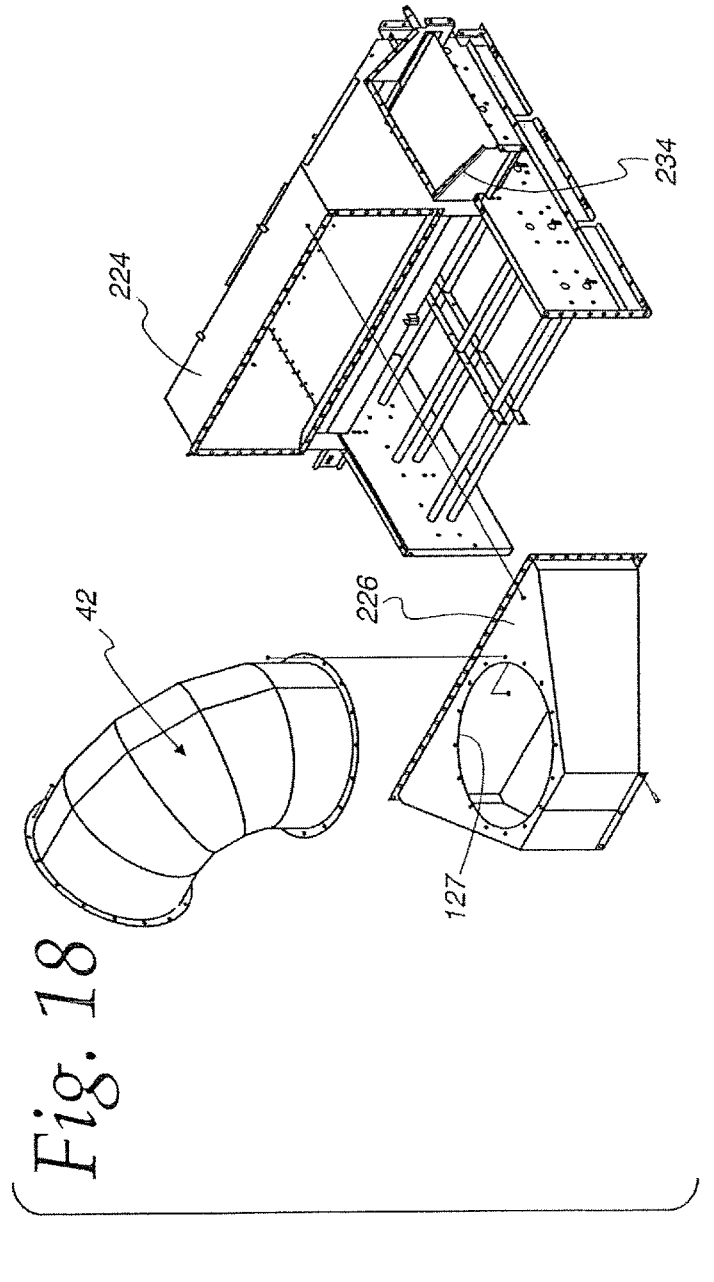
FIG. 18 is an enlarged, exploded, perspective view of the housing in FIGS. 14-17 and in relationship to a conduit section that communicates with the collection container.

When a predetermined weight is applied to the conveying component, the springs 218 will extend to locally lower the conveying component in the vicinity of the frame part 124, thereby to allow a greater clearance so that the heavy debris/rock may pass beyond the frame part 124 to move off of the end 106 of the conveying section 22*b* to the auxiliary conveyor 26*b*, as shown in FIGS. 10 and 13.

In FIGS. 14-18, additional details of the housing 34 and chamber 32 defined thereby are shown, as well as the interaction of the housing 34 with the conveying section 22*c*. These components are shown assembled on the apparatus in FIGS. 2-4.

The housing 34 has two main parts—a crop control component 224 and a transition component 226 that connects between the crop control component 224 and the conduit 42.

The crop control component 224 is generally wedge-shaped so that the portion of the chamber 32 bounded thereby diverges towards the transition component 226, which in turn converges towards the top opening 127.

Flexible flaps 228, 230 are provided on the housing 34 at the sides of the conveying section 22*c*. The flap 228 confines crop at one side of the conveying section 22*c*. Crop that is propelled to encounter the flexible flap 230 on the other side of the conveying section 22*c* is guided under its own weight downwardly by a convex surface thereon to the conveying surface 232 on the conveying section, which is shown with discrete slats 233 that enhance gripping and conveyance of crop. The flexible construction of the flaps 228, 230 allows them to absorb impact forces from the crop without inflicting damage thereon.

A lateral extension housing 234 supports an additional flexible flap 236 which overlies and affords a partial seal where the conveying section 22*c* departs from the chamber 32, thereby to maximize low pressure maintenance on the chamber 32 and air flow velocity therethrough.

To further reduce gaps that might compromise the low pressure maintenance in the chamber 32, a series of deflectable flaps 238 cooperatively span the width of the gap G and are normally biased to cooperatively block the gap G. Advancing heavy debris will pivot the flaps 238 against a biasing force to allow movement of such debris out of the processing path for delivery to the auxiliary conveyor 26*c*.

Repositionable access doors 240, 242 are provided at the front of the housing 34 with a separate repositionable access door 244 provided on the extension 234.

Figure 3A:
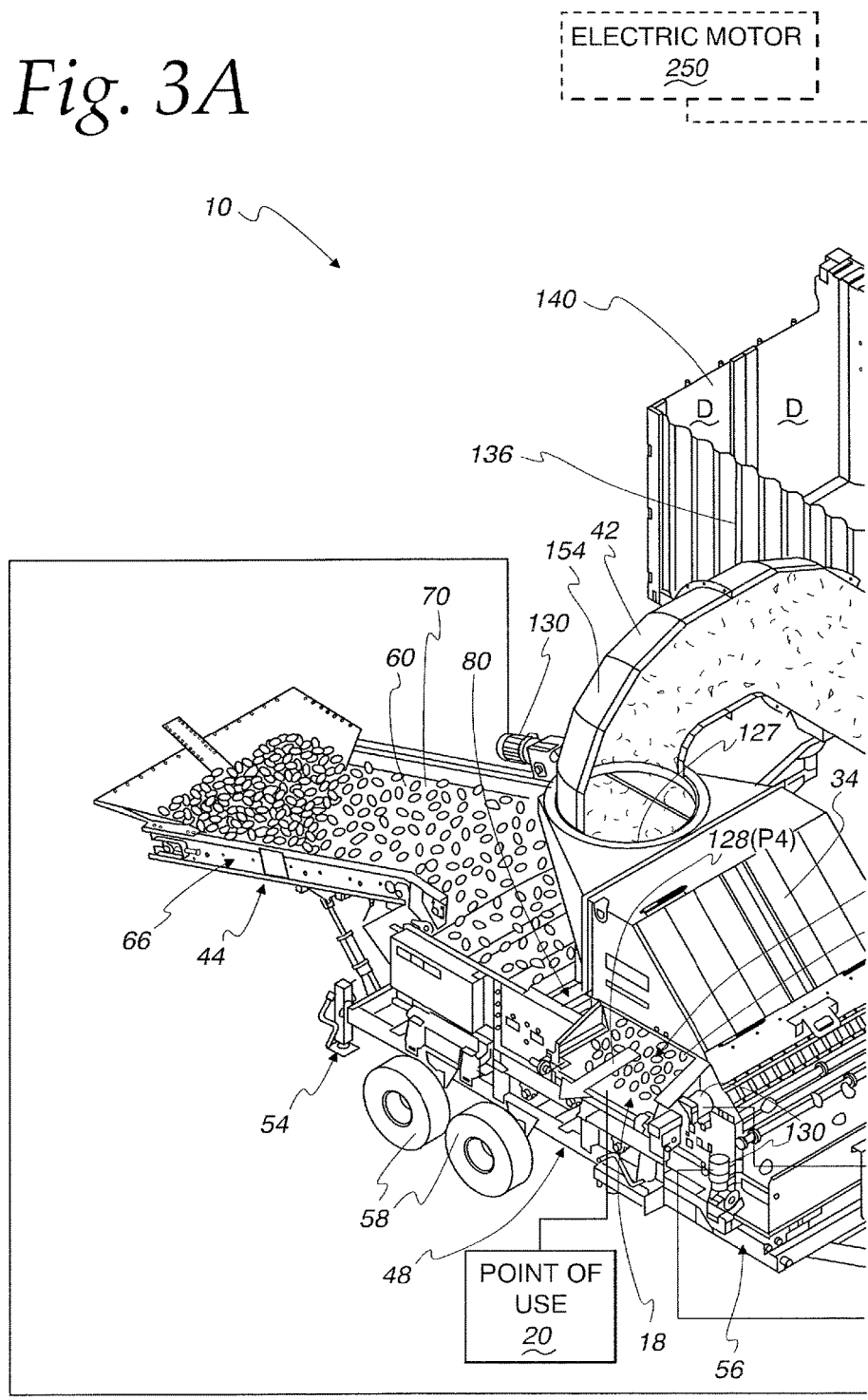

The evacuating system 36 in FIG. 3 is shown with a fan unit at 246 operated by a fuel powered engine 248, such as a diesel engine that may be operably connected to the fan unit 246 by conventional components such as an hydraulic clutch, sheaves, belts, etc. (not shown). An electric motor 250 might alternatively be used. An isolation sleeve 252 (FIG. 3) is used to connect to the collection container 40 to reduce any migrating vibration.

Figure 19:
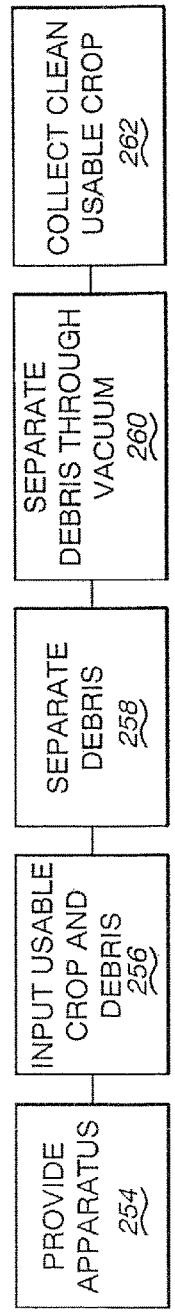
FIG. 19 is a flow diagram representation of a method for separating usable crop from intermixed debris according to the invention.

In FIG. 19, there is a flow diagram representation of a method of separating usable crop from intermixed debris, using an apparatus as described above.

As shown at block 254, an apparatus as described above is provided.

As shown at block 256, usable crop intermixed with debris is placed at an input location on a conveying system to be conveyed in a processing path.

As shown at block 258, through a first separating system, certain debris is separated from usable crop.

As shown at block 260, through a vacuum system, additional debris is separated from usable crop.

As shown at block 262, usable crop with removed debris is collected.

Figure 20:
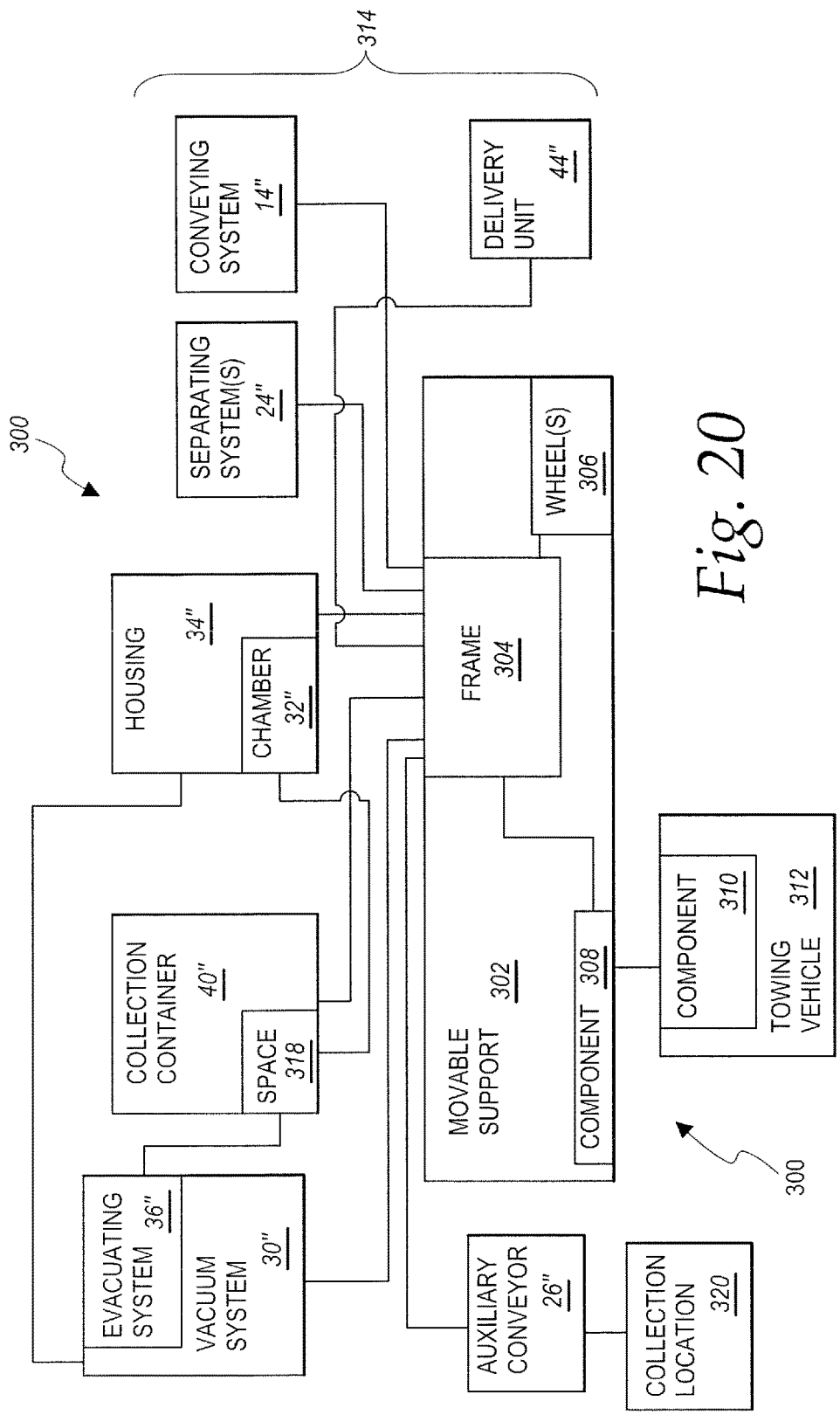
FIG. 20 is a schematic representation of a modified form of system/apparatus for separating usable crop from intermixed debris, according to the invention.
Figure 21:
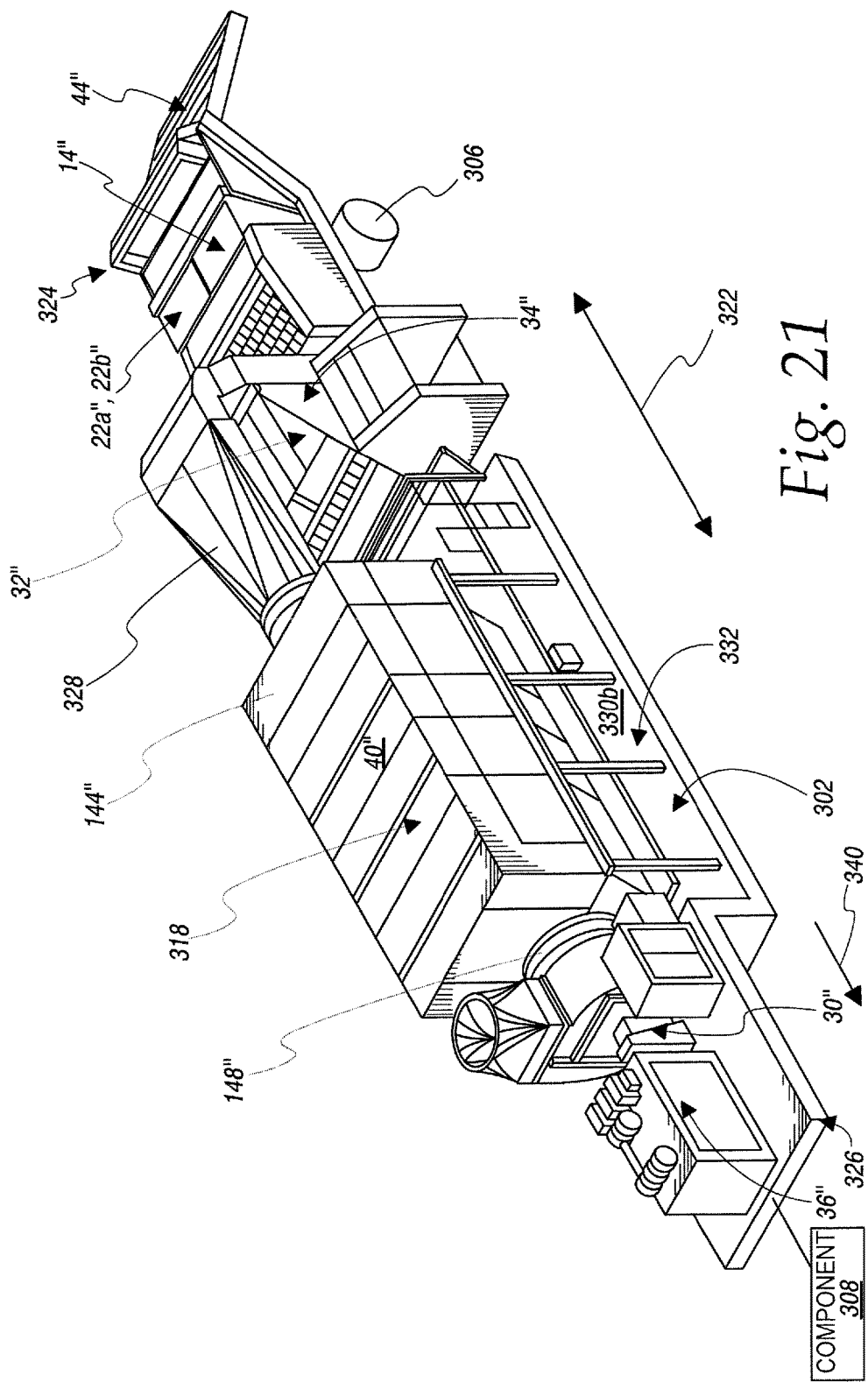
FIG. 21 is a perspective view of one exemplary form of system/apparatus as shown schematically in FIG. 20.
Figure 22:
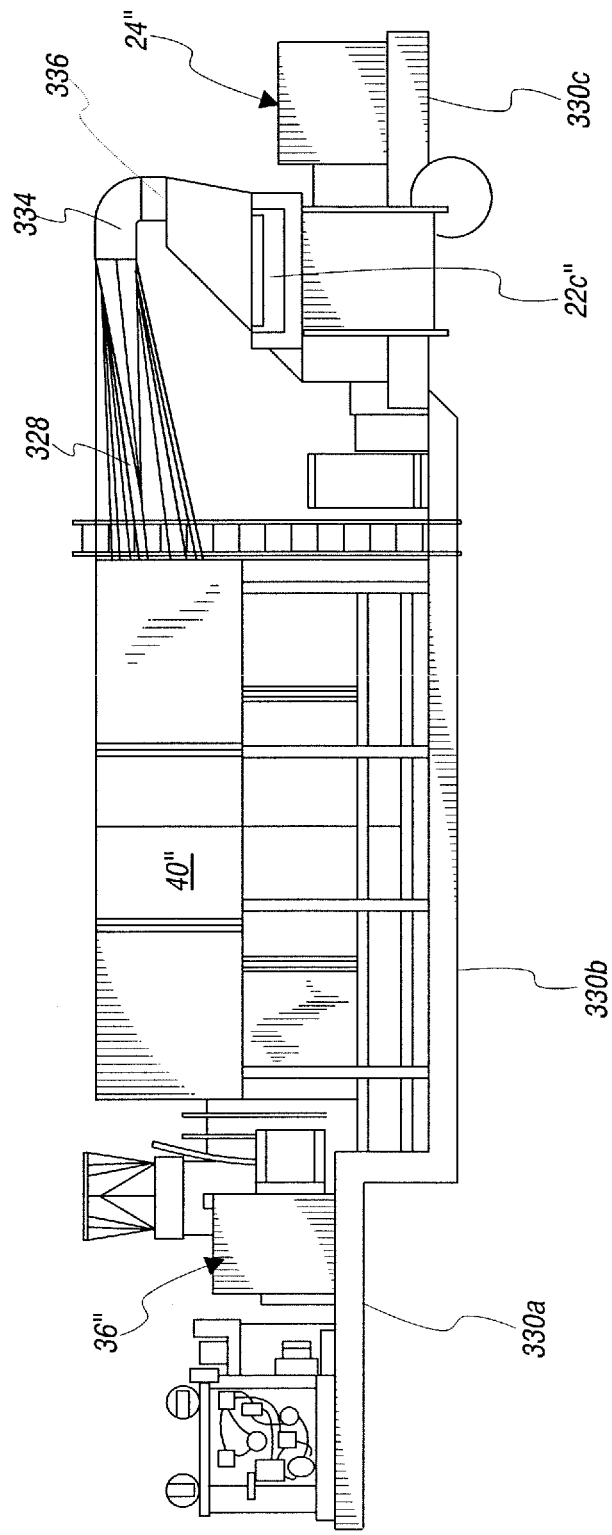
FIG. 22 is a side elevation view of the system/apparatus in FIG. 21.

In FIG. 20, a modified form of apparatus for separating usable crop from intermixed debris, according to the invention, is shown schematically at 300. The apparatus 300 has a movable support 302. The movable support has a frame 304 with at least one wheel 306 thereon that can be rolled against underlying terrain to relocate the apparatus 300.

The movable support 302 has a component 308 on the frame 304 that is configured to be hitched to a component 310 on a towing vehicle 312 that is usable to move the apparatus 300.

The apparatus 300 incorporates some or all of the systems/components in the earlier described embodiments into the movable support 302 to be movable as a unit therewith. The components/systems may have the same, or a similar, construction as those described above. The schematic showing is intended to encompass the earlier described components/systems in their depicted form and virtually an unlimited number of variations thereof and interactions therebetween. For purposes of simplicity, each of the components/systems on the apparatus 300 will be identified with the reference numerals used for corresponding components/systems described above and additionally include a "″" designation. Since the components/systems operate in substantially the same manner as those described above, there is no need to describe the structure or operation thereof in detail hereinbelow.

A conveying system 14″ is provided on the frame 304 of the movable support 302 and is configured to convey usable crop in a processing path (P as described above) from an upstream input location to a downstream output location.

One or more separating systems 24″ are mounted on the frame 304 of the movable support 302, with each configured to cause separation of debris intermixed with usable crop as usable crop is conveyed in the processing path. The different separating systems may separate debris from usable crop in the same manner or in different manners.

A vacuum system 30″ is provided on the frame 304 on the movable support 302 and is located preferably downstream of at least the initial separating system 24″. The vacuum system 30″ is configured to generate a low pressure volume which causes additional debris intermixed with the usable crop to be drawn away from the usable crop by vacuum.

A collection container 40″ is mounted on the frame 304 on the movable support 302 and is configured to accumulate debris drawn away from the usable crop during its conveyance in the path P.

The movable support 302, conveying system 14″, at least a first separating system 24″, the vacuum system 30″, and the collection container 40″ together define a functioning unit 314 that can be moved as one piece to relocate the apparatus 300.

An evacuating system 36″, that may be part of the vacuum system 30″ or an independent system, makes up part of the apparatus 300 and is mounted on the movable support 302. The evacuating system 36″ is configured to create a low pressure volume in a space 318 within the collection chamber 40″.

The apparatus 300 further has a housing 34″ with a chamber 32″ through which the processing path P extends. The vacuum system 30″ and/or the evacuating system 36″ generate the low pressure volume within the housing chamber 32″. The collection container 40″ is preferably downstream of the housing 34″. This location is not required.

The evacuating system 36″ is preferably downstream of the collection container 40″, though this again is not a requirement.

The apparatus 300 may further have a delivery unit 44″ on the frame 304 of the movable support 302. The delivery unit 44″ is configured to continuously direct a supply of intermixed debris and usable crop to an upstream input location for the conveying system 14".

The apparatus 300 may further include at least one auxiliary conveyor 26" on the frame 304 on the movable support 302. The at least one auxiliary conveyor 26" is configured to intercept downwardly traveling debris separated from the advancing usable crop and convey the same towards a collection location 320.

One exemplary form of the apparatus 300 will now be described with respect to FIGS. 21-24. As noted above, the basic components/systems can be essentially the same as those described above and thus there is no need to describe specific details thereof. What is significant is the basic arrangement of components as integrated into the movable support 302.

The movable support 302 has a length, as indicated by the double-headed arrow 322, between upstream and downstream ends 324, 326, respectively.

The aforementioned processing path P has at least a portion that extends substantially in a line from the upstream end 324 towards the downstream end 326. As described above, the conveying sections 22a", 22b" are independently operable and convey usable crop and attendant debris generally along this line.

The delivery unit 44" may be a permanent part of the apparatus 300 or may be separately attached thereto. The delivery unit 44" continuously directs a supply of intermixed debris and usable crop to the upstream input location 324 to the conveying system 14" made up in part by the conveying sections 22a", 22b".

The housing 34", bounding the chamber 32", is downstream of the conveying sections 22a", 22b".

The collection container 40", bounding the space 318, is downstream of the housing 32".

The vacuum system 30", including the evacuating system 36", is located downstream of the collection container 40".

Through the evacuating system 36", the vacuum system 30" creates a low pressure volume within the space 318. The space 318 is in communication with the housing chamber 32" to create a low pressure volume therein as well. This communication is effected through a funneling conduit 328 that has a cross-sectional shape that tapers progressively in a direction from the housing 34" towards the collection container 40".

This low pressure volume may be responsible for redirecting the conveying usable crop in a different path portion, as described above, but at least draws debris from within the housing chamber 32" into the collection container space 318 for accumulation.

The movable support 302 has three different frame platforms 330a, 330b, 330c. The platforms 330a, 330b, 330c are at different heights. The lowest level platform 330b supports the collection container 40", which is the highest profile component. The evacuating system 36" is on the most downstream platform 330a, with the housing 34" on the most upstream platform 330c.

The platform 330b is configured to define an upwardly facing walking surface 332 around at least a part of the outer perimeter of the collection container 40".

The funneling conduit 328 spans between the platforms 330b, 330c and has an elbow 334 that connects to the housing 34" to establish communication with the housing chamber 32" through a top opening 336 on the housing 34".

As in the prior embodiment, the conveying system 14" includes at least one discharge conveying section 22c" that is operable independently of the conveying sections 22a", 22b" and receives advancing usable crop after debris is separated therefrom by the separating system(s) 24". The at least one discharge conveying section 22c" directs received advancing usable crop transversely to the length L of the movable support 302 to a collection location 338.

The aforementioned auxiliary conveyor 26" may be provided at any location where debris is separated along the conveying path to intercept downwardly traveling debris and convey the same towards the collection location 320. One or more auxiliary conveyors 26" may be strategically situated.

The collection container 40" has the same configuration as the container 40 with openings 144", 148" located a substantial distance above a floor 150" so that a substantial height of debris can be accumulated upon the floor 150" without obstructing the openings 144", 148". Accordingly, processing may be carried out for relatively long periods without requiring emptying of the collection container 40".

The various components/systems are arranged on the movable support 302 so that the overall system length L1 and width W1 of the apparatus 300 allow the apparatus 300 to be towed on a public right-of-way.

In the depicted exemplary form of the apparatus, wheels 304 are provided on the frame 304 at locations spaced in a fore-and-aft direction to facilitate over-the-road travel.

The hitching component 308 is provided at the downstream region of the platform 330a so that the apparatus 300 is towed by the vehicle 312 from the downstream end of the movable support 302 in a direction indicated by the arrow 340.

To minimize the width W1, the rectangular footprint of the collection container 40" is arranged so that its longer dimension aligns with the length of the movable support 302. The components/systems are spaced serially lengthwise of the movable support 302 to provide a width dimension W1 that can be accommodated by public right-of-ways.

The shape of the funneling conduit 328 allows a relatively compact structure to be used for communication of debris from the housing 34" to the collection container 40".

As noted above, the systems/components may be formed substantially identically to those described above whereby the conveying usable crop with associated debris moves in substantially the same processing path P.

However, it is not necessary that the components/systems have the same construction. For example, while the above-described system causes usable crop to be moved in opposite directions over different parts of the processing path, this is not a requirement. The equal pressure volume may be provided simply to control debris rather than redirect the usable crop in any significant manner.

The foregoing disclosure of specific embodiments is intended to be illustrative of the broad concepts comprehended by the invention.

The invention claimed is:

1. An apparatus for separating usable crop from intermixed debris, the apparatus comprising:
a movable support;
a conveying system on the movable support configured to convey usable crop in a processing path from an upstream input location to a downstream output location;
at least a first separating system on the movable support configured to cause separation of debris intermixed with usable crop in a first manner as usable crop is conveyed in the processing path;
a vacuum system on the movable support downstream of the first separating system and configured to generate a low pressure volume which causes additional debris intermixed with the usable crop to be drawn away from the usable crop by vacuum; and a collection container on the movable support configured to accumulate debris drawn away from the conveying usable crop, wherein the movable support, conveying system, at least first separating system, vacuum system, and collection container define a unit that can be advanced over an underlying surface through the movable support to relocate the apparatus, wherein the apparatus further comprises an evacuating system on the movable support, the evacuating system configured to create a low pressure volume in a space in the collection container.

2. The apparatus for separating usable crop from intermixed debris according to claim 1 wherein the movable support comprises a f with wheels that can be rolled against underlying terrain to relocate the apparatus.

3. The apparatus for separating usable crop from intermixed debris according to claim 2 wherein the movable support comprises a component that is configured to be hitched to a towing vehicle that is usable to move the apparatus relative to an underlying surface trough the movable support.

4. The apparatus for separating usable crop from intermixed debris according to claim 1 wherein the apparatus is configured so that the low pressure volume which causes additional debris intermixed with the usable crop to be drawn away from the usable crop is created by the evacuating system.

5. The apparatus for separating usable crop from intermixed debris according to claim 1 wherein the movable support has a length between upstream and downstream ends, the processing path has at least a portion that extends substantially in a line from the upstream end towards the downstream end, the apparatus comprises a housing with a chamber through which the processing path extends, the vacuum system generates the low pressure volume within the housing chamber, and the collection container is downstream of the housing.

6. The apparatus for separating usable crop from intermixed debris according to claim 5 wherein the evacuating system is downstream of the collection container and configured to create a low pressure volume in a space in the collection container.

7. The apparatus for separating usable crop from intermixed debris according to claim 5 wherein the apparatus further comprises a funneling conduit that directs debris from the housing chamber in a downstream direction into the collection container.

8. The apparatus for separating usable crop from intermixed debris according to claim 1 wherein the apparatus further comprises a delivery unit on the movable support that is configured to continuously direct a supply of intermixed debris and usable crop to the upstream input location.

9. The apparatus for separating usable crop from intermixed debris according to claim 1 wherein the at least first separating system comprises a second separating system spaced along the processing path from the first separating system and configured to cause separation of debris intermixed with usable crop in a second manner that is different than the first manner.

10. The apparatus for separating usable crop from intermixed debris according to claim 1 wherein the conveying system comprises a plurality of cooperating, independently operating, conveying sections.

11. The apparatus for separating usable crop from intermixed debris according to claim 1 wherein the apparatus further comprises at least one auxiliary conveyor on the movable support configured to intercept downwardly traveling debris and convey intercepted downwardly traveling debris towards a collection location.

12. The apparatus for separating usable crop from intermixed debris according to claim 5 wherein the housing has a top opening and the evacuating system is in communication with the top opening.

13. The apparatus for separating usable crop from intermixed debris according to claim 5 wherein the conveying system comprises at least one discharge conveying section that receives advancing usable crop after debris is separated from the advancing usable crop by the at least first separating system, the at least one discharge conveying section directing received advancing usable crop transversely to the length of the movable support to a collection location.

14. The apparatus for separating usable crop from intermixed debris according to claim 5 wherein the movable support comprises first and second platforms at different heights, the collection container is supported on the first platform and the housing is supported on the second platform.

15. The apparatus for separating usable crop from intermixed debris according to claim 14 wherein the collection container has an outer perimeter and the first platform is configured to define an upwardly facing walking surface around at least a part of the outer perimeter of the collection container.

16. The apparatus for separating usable crop from intermixed debris according to claim 5 wherein the space defined by the collection container is bounded by a floor, wherein the collection container has spaced first and second openings, the first opening receiving debris from the housing chamber, the second opening in communication with the evacuating system, wherein each of the first and second openings is spaced above the floor so that a substantial height of debris can be accumulated upon the floor without obstructing the first or second openings.

17. The apparatus for separating usable crop from intermixed debris according to claim 6 wherein the movable support comprises a frame with wheels that can be rolled against underlying terrain to relocate the apparatus, the movable support frame further comprising a component at the downstream end of the movable support that is configured to be hitched to a towing vehicle that is usable to move the apparatus.

18. The apparatus for separating usable crop from intermixed debris according to claim 1 wherein the conveying system is configured to cause the usable crop to move in opposite directions over different parts of the processing path.

19. The apparatus for separating usable crop from intermixed debris according to claim 3 wherein the apparatus has a length and width that allow the apparatus to be towed on a public right-of-way.

20. An apparatus for separating usable crop from intermixed debris, the apparatus comprising:

a movable support;

a conveying system on the movable support configured to convey usable crop in a processing path from an upstream input location to a downstream output location;

at least a first separating system on the movable support configured to cause separation of debris intermixed with usable crop in a first manner as usable crop is conveyed in the processing path;

a vacuum system on the movable support downstream of the first separating system and configured to generate a low pressure volume which causes additional debris intermixed with the usable crop to be drawn away from the usable crop by vacuum; and a collection container on the movable support configured to accumulate debris drawn away from the conveying usable crop, wherein the movable support, conveying system, at least first separating system, vacuum system, and collection container define a unit that can be moved to relocate the apparatus, wherein the apparatus further comprises at least one auxiliary conveyor on the movable support configured to intercept downwardly traveling debris and convey intercepted downwardly traveling debris towards a collection location spaced from the collection container.

21. An apparatus for separating usable crop from intermixed debris, the apparatus comprising:

a movable support;

a conveying system on the movable support configured to convey usable crop in a processing path from an upstream input location to a downstream output location;

at least a first separating system on the movable support configured to cause separation of debris intermixed with usable crop in a first manner as usable crop is conveyed in the processing path;

a vacuum system on the movable support downstream of the first separating system and configured to generate a low pressure volume which causes additional debris intermixed with the usable crop to be drawn away from the usable crop by vacuum; and a collection container on the movable support configured to accumulate debris drawn away from the conveying usable crop, wherein the movable support, conveying system, at least first separating system, vacuum system, and collection container define a unit that can be moved to relocate the apparatus, wherein the movable support has a length between upstream and downstream ends, the processing path has at least a portion that extends substantially in a line from the upstream end towards the downstream end, the apparatus comprises a housing with a chamber through which the processing path extends, the vacuum system generates the low pressure volume within the housing chamber, and the collection container is downstream of the housing, wherein the conveying system comprises at least one discharge conveying section that receives advancing usable crop after debris is separated from the advancing usable crop by the at least first separating system, the at least one discharge conveying section directing received advancing usable crop transversely to the length of the movable support to a collection location.

22. An apparatus for separating usable crop from intermixed debris, the apparatus comprising:

a movable support;

a conveying system on the movable support configured to convey usable crop in a processing path from an upstream input location to a downstream output location;

at least a first separating system on the movable support configured to cause separation of debris intermixed with usable crop in a first manner as usable crop is conveyed in the processing path;

a vacuum system on the movable support downstream of the first separating system and configured to generate a low pressure volume which causes additional debris intermixed with the usable crop to be drawn away from the usable crop by vacuum; and a collection container on the movable support configured to accumulate debris drawn away from the conveying usable crop, wherein the movable support, conveying system, at least first separating system, vacuum system, and collection container define a unit that can be moved to relocate the apparatus, wherein the movable support has a length between upstream and downstream ends, the processing path has at least a portion that extends substantially in a line from the upstream end towards the downstream end, the apparatus comprises a housing with a chamber through which the processing path extends, the vacuum system generates the low pressure volume within the housing chamber, and the collection container is downstream of the housing, wherein the movable support comprises first and second platforms at different heights, the collection container is supported on the first platform and the housing is supported on the second platform, wherein the collection container has an outer perimeter and the first platform is configured to define an upwardly facing walking surface around at least a part of the outer perimeter of the collection container.

23. An apparatus for separating usable crop from intermixed debris, the apparatus comprising:

a movable support;

a conveying system on the movable support configured to convey usable crop in a processing path from an upstream input location to a downstream output location;

at least a first separating system on the movable support configured to cause separation of debris intermixed with usable crop in a first manner as usable crop is conveyed in the processing path;

a vacuum system on the movable support downstream of the first separating system and configured to generate a low pressure volume which causes: a) usable crop to be advanced in a portion of the processing path; and b) additional debris intermixed with the usable crop to be drawn away from the usable crop by vacuum; and a collection container on the movable support configured to accumulate debris drawn away from the conveying usable crop, wherein the movable support, conveying system, at least first separating system, vacuum system, and collection container define a unit that can be moved to relocate the apparatus.

* * * * *

UNITED STATES PATENT AND TRADEMARK OFFICE
CERTIFICATE OF CORRECTION

PATENT NO. : 10,363,579 B2
APPLICATION NO. : 15/674827
DATED : July 30, 2019
INVENTOR(S) : Michael A. Nilson It is certified that error appears in the above-identified patent and that said Letters Patent is hereby corrected as shown below:

In the Claims

Column 15, Lines 16-19, Claim 2 and Lines 20-25, Claim 3 should read:

2. The apparatus for separating usable crop from intermixed debris according to claim 1 wherein the movable support comprises a frame with wheels that can be rolled against underlying terrain to relocate the apparatus.

3. The apparatus for separating usable crop from intermixed debris according to claim 2 wherein the movable support comprises a component that is configured to be hitched to a towing vehicle that is usable to move the apparatus relative to an underlying surface through the movable support.

Signed and Sealed this
Tenth Day of September, 2019

Andrei Iancu
*Director of the United States Patent and Trademark Office*